US005563313A

United States Patent [19]

Chung et al.

[11] Patent Number: 5,563,313
[45] Date of Patent: Oct. 8, 1996

[54] IMMOBILIZED LEWIS ACID CATALYSTS

[75] Inventors: Tze-Chiang Chung, State College, Pa.; Frank J. Chen, Edison; Jon E. Stanat, Westfield, both of N.J.; Alok Kumar, State College, Pa.

[73] Assignee: Exxon Chemical Patents Inc., Linden, N.J.

[21] Appl. No.: 398,463

[22] Filed: Mar. 3, 1995

Related U.S. Application Data

[60] Division of Ser. No. 905,582, Jun. 26, 1992, Pat. No. 5,409,873, which is a continuation-in-part of Ser. No. 723,130, Jun. 28, 1991, Pat. No. 5,288,677.

[51] Int. Cl.$^6$ .................................................. C07C 2/02
[52] U.S. Cl. ........................................ 585/525; 526/237
[58] Field of Search ............................ 585/525; 526/237

[56] References Cited

U.S. PATENT DOCUMENTS

| | | | |
|---|---|---|---|
| 3,262,887 | 7/1966 | Calfee | 252/429 |
| 3,721,632 | 3/1973 | Miller et al. | 252/442 |
| 3,925,495 | 12/1975 | Rodewald | 260/666 |
| 3,984,352 | 10/1976 | Rodewald | 252/436 |
| 4,112,011 | 9/1978 | Kolombos | 260/683.15 |
| 4,116,880 | 9/1978 | Olah | 252/429 |
| 4,139,417 | 2/1979 | Marie et al. | 252/51.5 |
| 4,167,616 | 9/1979 | Bollinger | 526/197 |
| 4,235,756 | 11/1980 | Slaugh | 252/463 |
| 4,288,449 | 9/1981 | Bliesener et al. | 424/274 |
| 4,342,849 | 8/1982 | Kennedy | 525/333.7 |
| 4,490,571 | 12/1984 | O'Hara et al. | 585/525 |
| 4,558,170 | 12/1985 | Chen et al. | 585/532 |
| 4,605,808 | 8/1986 | Samson | 585/525 |
| 4,638,092 | 1/1987 | Ritter | 568/1 |
| 4,645,576 | 2/1987 | Takezono et al. | 203/30 |
| 4,698,403 | 10/1987 | Klabunde | 526/126 |
| 4,719,190 | 1/1988 | Drago et al. | 502/64 |
| 4,734,472 | 3/1988 | Chung | 526/239 |
| 4,751,276 | 6/1988 | Chung | 526/158 |
| 4,798,667 | 1/1989 | Drago et al. | 208/117 |
| 4,929,800 | 5/1990 | Drago et al. | 585/744 |
| 4,987,200 | 1/1991 | Datta et al. | 526/75 |
| 5,288,677 | 2/1994 | Chung et al. | 502/152 |
| 5,409,873 | 4/1995 | Chung et al. | 502/152 |

FOREIGN PATENT DOCUMENTS

| | | |
|---|---|---|
| 87311535.6 | 7/1988 | European Pat. Off. |
| 87311534.9 | 7/1988 | European Pat. Off. |
| 27-188996 | of 0000 | Japan |

OTHER PUBLICATIONS

T. C. Chung and D. Rhubright, *Macromolecules*, vol. 24, pp. 970–972, (1991) American Chemical Society.

T. C. Chung, *Journal of Inorganic and Organometallic Polymers*, vol. 1, No. 1, 37–51, (1991) Plenum Publishing Company.

J. P. Kennedy, *Carbocationic Polymerization*, John Wiley & Sons, New York (1982).

J. P. Kennedy, *Cationic Polymerization Of Olefins; A Critical Inventory*, John Wiley & Sons, New York (1975).

H. C. Brown, *Organic Synthesis Via Boranes*, pp. 1–13, John Wiley & Sons, New York (1975).

Primary Examiner—Asok Pal
Attorney, Agent, or Firm—Harvey L. Cohen

[57] ABSTRACT

Immobilized Lewis Acid catalyst comprising polymer having at least one Lewis Acid immobilized within the structure therein, said polymer having monomer units represented by the structural formula:

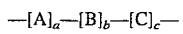

wherein a represents about 1 to about 99 mole %
b represents about 0 to about 50 mole %
c represents about 1 to about 99 mole %
a+b+c is preferably about 100%;

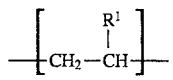

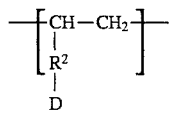

C is selected from the group consisting of:

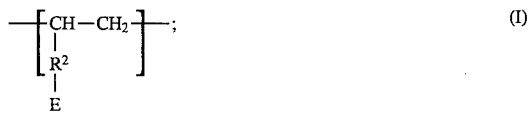

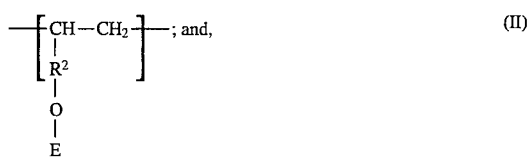

(III) combinations thereof, wherein
D is OH, halide, OR$^4$, NH$_2$, NHR$^3$, OM', or OM";
E is the residue of the reaction of at least one Lewis Acid with the D substituent of monomer unit B;

R$^1$ represents proton, C$_1$–C$_{24}$ alkyl group, or C$_3$–C$_{24}$ cycloalkyl;

R$^2$ represents C$_1$–C$_{24}$ alkylene group, C$_3$–C$_{24}$ cycloalkylene, C$_6$–C$_{18}$ arylene, or C$_7$–C$_{30}$ alkylarylene;

R$^3$ represents C$_1$–C$_{24}$ alkyl, C$_3$–C$_{24}$ cycloalkyl, C$_1$–C$_{24}$ aryl, or C$_7$–C$_{30}$ alkylaryl;

R$^4$ represents C$_1$–C$_{24}$ alkyl, C$_3$–C$_{24}$ cycloalkyl, C$_1$–C$_{24}$ aryl, or C$_7$–C$_{30}$ alkylaryl;
M' represents alkali metal;
M" represents alkaline-earth metal.

Also disclosed are polymerization and alkylation processes utilizing the immobilized Lewis Acid catalysts. Another aspect of the present invention is a method of manufacturing immobilized Lewis Acid catalysts.

17 Claims, 7 Drawing Sheets

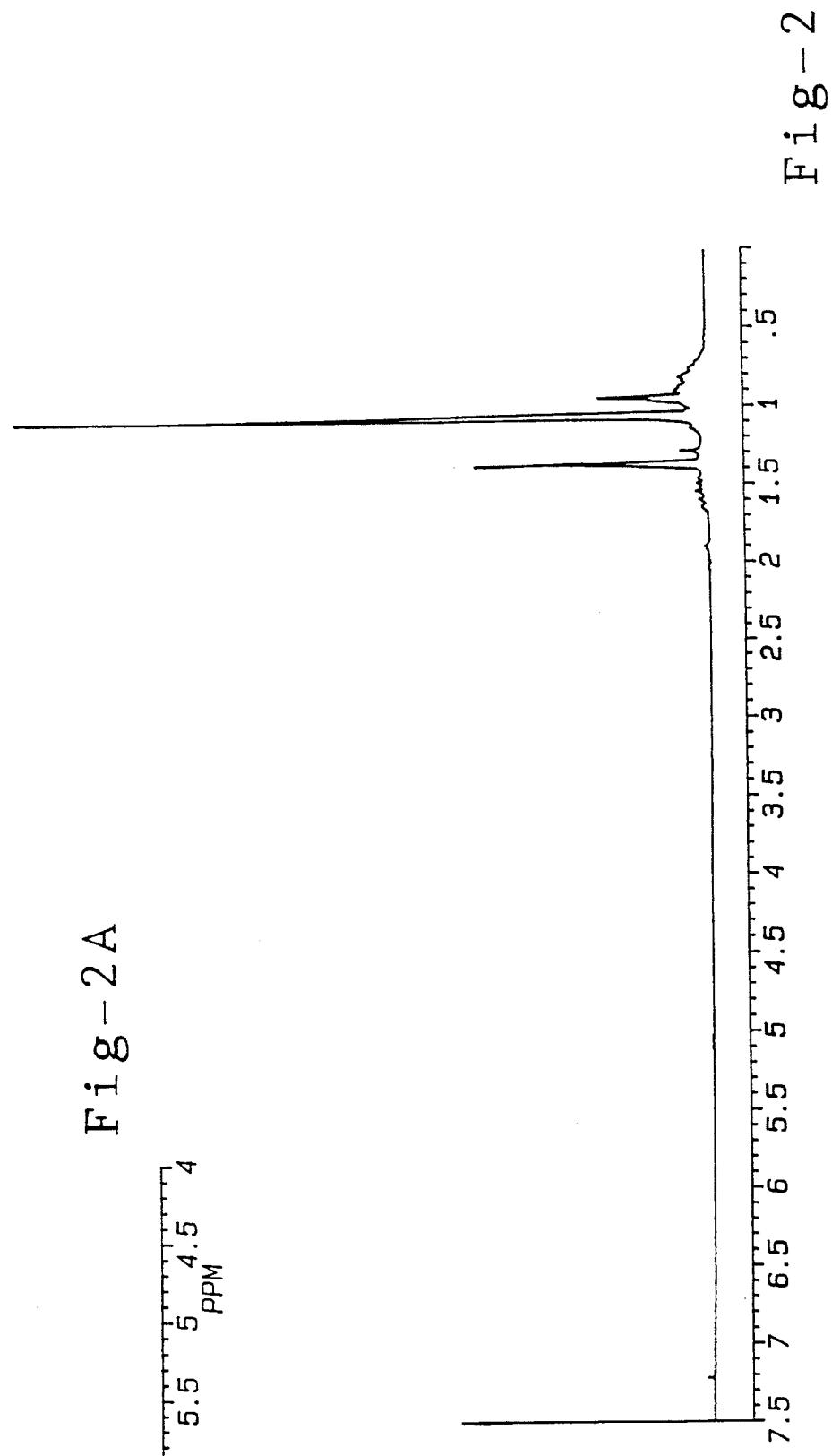
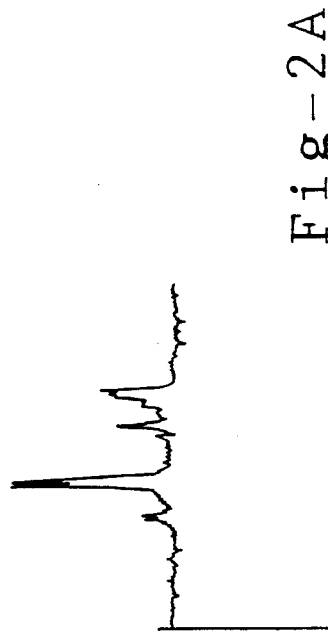
Fig-2
Fig-2A

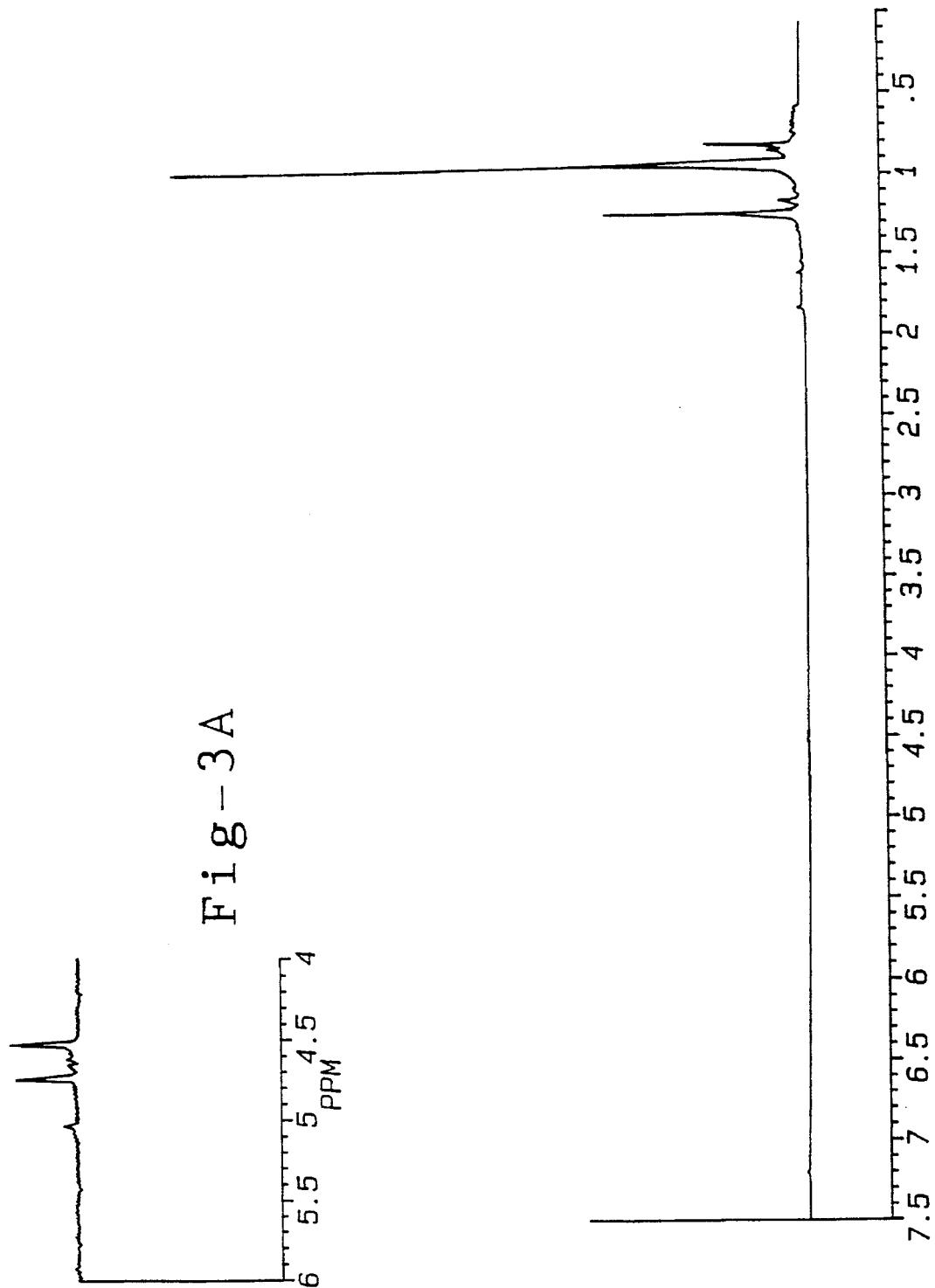

IMMOBILIZED LEWIS ACID CATALYSTS

CROSS-REFERENCE TO RELATED APPLICATIONS

This is a division of application Ser. No. 905,582, filed Jun. 26, 1992, now U.S. Pat. No. 5,409,873 which is a CIP of U.S. Ser. No. 723,130 filed Jun. 28, 1991, now U.S. Pat. No. 5,288,677.

TECHNICAL FIELD

The field of art to which this invention pertains is catalysts, in particular, immobilized Lewis Acid catalysts, and a process to prepare polymer using said catalysts as well as the polymer product.

BACKGROUND OF THE INVENTION

Lewis Acids have been widely used as catalysts in carbocationic polymerization processes to catalyze the polymerization of monoolefins. Examples of Lewis Acid catalysts include $AlCl_3$, $BF_3$, $BCl_3$, $TiCl_4$, $Al(C_2H_5)_3$, $Al(C_2H_5)_2Cl$, and $Al(C_2H_5)Cl_2$. Such carbocationic polymerization catalysts have many advantages, including high yield, fast reaction rates, good molecular weight control, and utility with a wide variety of monomers. However, conventional carbocationic polymerization processes typically employ Lewis Acid catalysts in unsupported form. Hence, these catalysts, typically, cannot be recycled or reused in a cost effective manner.

In a typical carbocationic polymerization process, such as the carbocationic polymerization of isobutylene, a catalyst feedstream in a liquid or gaseous form and a monomer feedstream are fed simultaneously into a conventional reactor. In the reactor, the streams are intermingled and contacted under process conditions such that a desired fraction of the monomer feedstream is polymerized. Then, after an appropriate residence time in the reactor, a discharge stream is withdrawn from the reactor. The discharge stream contains polymer, unreacted monomer and catalyst. In order to recover the polymer, the catalyst and unreacted monomer must be separated from this stream. Typically, there is at least some residue of catalyst in the polymer which cannot be separated. After separation, the catalyst is typically quenched and neutralized. The quenching and neutralization steps tend to generate large quantities of waste which must typically be disposed of as hazardous waste.

The recycling or reuse of Lewis Acid catalysts used in polymer processes is difficult because of the chemical and physical characteristics of these catalysts. For example, most Lewis Acid catalysts are non-volatile and cannot be distilled off. Other catalysts are in a solid particulate form and must be separated from the polymer stream by physical separation means. Some Lewis Acid catalysts are gaseous, such as $BF_3$. The gases can be recycled and reused, but with considerable difficulty, by utilizing gas-liquid separators and compressors.

There have been several attempts made to support Lewis Acid catalysts on the surface of inorganic substrates such as silica gel, alumina, and clay. Although these approaches are somewhat successful in recycling the Lewis Acid catalysts, there are several disadvantages associated with their use. One particularly strong disadvantage is that these approaches to supported catalysts generally produce only low molecular weight oligomers. Another disadvantage is that the catalysts (supported on inorganic substrates) typically leach out during the reaction since the catalysts tend to not be firmly fixed to the supporting substrates.

Attempts to support Lewis Acid catalysts can be characterized as falling into two basic classes; namely, those which rely on physical adsorption and those wherein the Lewis Acid chemically reacts with the support.

U.S. Pat. No. 3,925,495 discloses a catalyst consisting of graphite having a Lewis Acid intercalated in the lattice thereof.

U.S. Pat. No. 4,112,011 discloses a catalyst comprising gallium compounds on a suitable support such as aluminas, silicas and silica aluminas.

U.S. Pat. No. 4,235,756 discloses a catalyst comprising porous gamma alumina impregnated with an aluminum hydride.

U.S. Pat. No. 4,288,449 discloses chloride alumina catalysts.

U.S. Pat. Nos. 4,734,472 and 4,751,276 disclose a method for preparing functionalized (e.g., hydroxy functionalized) alpha-olefin polymers and copolymers derived from a borane containing intermediate.

U.S. Pat. No. 4,167,616 discloses polymerization with diborane adducts or oligomers of boron-containing monomers.

U.S. Pat. No. 4,698,403 discloses a process for the preparation of ethylene copolymers in the presence of selected nickel-containing catalysts.

U.S. Pat. No. 4,638,092 discloses organo-boron compounds with strong aerobic initiator action to start polymerizations.

U.S. Pat. No. 4,342,849 discloses novel telechelic polymers formed by hydroborating diolefins to polyboranes and oxidizing the polymeric boranes to form the telechelic dehydroxy polymer. No use of the resulting polymer to support Lewis Acid catalysts is disclosed.

U.S. Pat. No. 4,558,170 discloses a continuous cationic polymerization process wherein a cocatalyst is mixed with a monomer feedstream prior to introduction of the feedstream to a reactor containing a Lewis Acid catalyst.

U.S. Pat. Nos. 4,719,190, 4,798,190 and 4,929,800 disclose hydrocarbon conversion and polymerization catalysts prepared by reacting a solid adsorbent containing surface hydroxyl groups with certain Lewis Acid catalysts in halogenated solvent. The only disclosed adsorbents are inorganic; namely, silica alumina, boron oxide, zeolite, magnesia and titania.

U.S. Pat. No. 4,605,808 discloses a process for producing polyisobutene using a complex of boron trifluoride and alcohol as catalyst.

U.S. Pat. No. 4,139,417, discloses amorphous copolymers of monoolefins or of monoolefins and nonconjugated dienes with unsaturated derivatives of imides. In the preparation of the polymer the imide is complexed with a Lewis Acid catalyst.

Japanese Patent Application No. 188996/1952 (Laid Open No. J59080413A/1984) discloses a process for preparing a copolymer of an olefin and a polar vinyl monomer which comprises copolymerizing an olefin with a complex of the polar vinyl monomer and a Lewis acid.

European Patent Application No. 87311534.9 (Publication No. EPA 0274912) discloses polyalcohol copolymers made using borane chemistry.

T. C. Chung and D. Rhubright, *Macromolecules*, Vol. 24, 970–972, (1991) discloses functionalized polypropylene copolymers made using borane chemistry.

T. C. Chung, *Journal of Inorganic and Organometallic Polymers*, Vol. 1, No. 1, 37–51, (1991) discloses the preparation of polyboranes and borane monomers.

U.S. Pat. No. 4,849,572 discloses a process for preparing polybutenes having enhanced reactivity using a $BF_3$ catalyst. Polybutene is produced which has a number average molecular weight in the range of from 500 to 5,000. The polymer has a total terminal double-bond content of at least 40% based on total theoretical unsaturation of the polybutene. The polybutene contains at least 50% by weight isobutylene units based on the polybutene number average molecular weight. The process is accomplished by contacting a feed supply comprising at least 10% by weight isobutylene based on the weight of the feed with a $BF_3$ catalyst under conditions to cationically polymerize the feed in liquid phase to form polybutene. The polymer is immediately quenched with a quench medium sufficient to deactivate the $BF_3$ catalyst.

There has been a continuous search for catalysts having high efficiency which can be recycled or reused in cationic polymerization processes. The present invention was developed pursuant to this search.

SUMMARY OF THE INVENTION

One aspect of the present invention provides immobilized Lewis Acid catalyst, comprising polymer having at least one Lewis Acid immobilized within the structure therein, said polymer having repeating monomer units represented by the structural formula:

$$-[A]_a-[B]_b-[C]_c-$$

wherein a represents about 1 to about 99 mole %,
b represents about 0 to about 50 mole %,
c represents about 1 to about 99 mole %,
a+b+c is preferably about 100%;

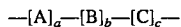

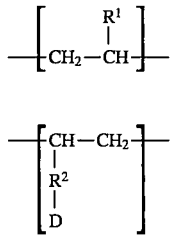

C is selected from the group consisting of:

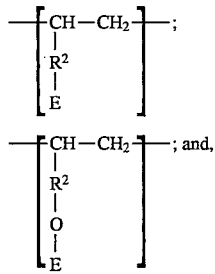

combinations thereof.
D is OH, halide, $OR^4$, $NH_2$, $NHR^3$, OM', or OM";
E is the residue of the reaction of at least one Lewis Acid with the D substituent of monomer unit B;

$R^1$ represents a hydrogen ion (i.e., a proton), a $C_1$–$C_{24}$ alkyl group (e.g., preferably $C_1$–$C_{12}$, more preferably $C_1$–$C_4$), or a $C_3$–$C_{24}$ cyclo alkyl group;

$R^2$ represents a $C_1$–$C_{24}$ alkylene group (e.g., $C_1$–$C_{10}$, more preferably $C_3$–$C_5$), a $C_3$–$C_{24}$ cyclo alkylene group, a $C_6$–$C_{18}$ arylene group, or a $C_7$–$C_{30}$ alkylarylene group;

$R^3$ represents a $C_1$–$C_{24}$ alkyl group (e.g., preferably $C_1$–$C_{12}$, and more preferably $C_1$–$C_4$), a $C_3$–$C_{24}$ cyclo alkyl group, a $C_1$–$C_{24}$ aryl group, or a $C_7$–$C_{30}$ alkylaryl group;

$R^4$ represents a $C_1$–$C_{24}$ alkyl group (e.g., more typically $C_1$–$C_{12}$, preferably $C_1$–$C_{24}$), a $C_1$–$C_{24}$ cyclo alkyl group, a $C_1$–$C_{24}$ aryl group, or a $C_7$–$C_{30}$ alkylaryl group;

M' represents alkali metal;
M" represents alkaline-earth metal.

The immobilized catalyst is derived from: a functionalized copolymer having the formula $-[A]_a-[B]_d-$, wherein A, B and a are defined as above. "d" represents about 1 to about 99 mole percent and is equal to the sum of b plus c. The functionalized copolymer has a number average molecular weight of from 300 to 10,000,000, preferably 3,000 to 10,000,000, more preferably 3,000 to 3,000,000, yet more preferably 3,000 to 100,000, yet more preferably greater than 5,000 to 10,000 and most preferably greater than 10,000 to 45,000 with a particularly useful and preferred functionalized copolymer having a number average molecular weight of about 35,000.

A particularly preferred immobilized catalyst has a "b" of substantially zero mole percent, and $R^2$ which is a $C_3$ to $C_6$ alkylene group. The preferred immobilized catalyst is a solid having a particle size of from 0.001 to about 1.0 millimeters and more preferably from 0.01 to about 0.5 millimeters in average diameters.

Another aspect of the present invention relates to a process for using the above immobilized Lewis Acid catalyst. The catalysts can be used to produce both high and low molecular weight polymer products, at relatively high reaction temperatures.

In a preferred embodiment of the above process at least one inlet stream comprising monomer feed to be polymerized is fed to a reactor having at least one discharge stream. The monomer feed is polymerized in the reactor in the presence of the above-described immobilized Lewis Acid catalyst. The resulting polymerized polymer product is removed from the reactor along with unreacted monomers in the discharge stream while the immobilized catalyst is retained in the reactor.

The present invention includes cationically polymerized polymer product made using the immobilized catalyst of the present invention. Such polymers can be made at any suitable molecular weights with preferred ranges being from 300 to 1,000,000, more preferably 300 to 500,000 number average molecular weight. The polymer product preferably has a molecular weight distribution ranging from 1.1 to about 8.0. However, narrower weight distributions of 1.8 to 3, and preferably 1.8 to 2.5 can be made. The molecular weight and molecular weight distribution can be tailored to particular uses. Useful polymers made using the immobilized catalyst can have number average molecular weights of from 300 to 5,000 and more preferably from 500 to 2500 for use to make materials such as dispersion aids for lubricating oil compositions. Higher molecular weight polymers having a molecular weight of from 10,000 to 100,000, and preferably from 20,000 to 80,000 are useful to prepare viscosity improvers for lubricating oil compositions.

Yet another aspect of the present invention relates to a process for alkylating an organic substrate with alkylating agent by contacting a mixture of substrate and alkylating agent in the presence of the above described immobilized Lewis Acid catalyst under alkylation conditions.

The substrate to be alkylated can be, for example, olefin, alkane, alkyl halides, aromatic, substituted aromatic or multi-substituted aromatic, and mixtures, and the alkylating agent can be olefin, alkane, alkyl halide, aromatic hydrocarbon, hydroxyaromatic hydrocarbon and mixtures; subject to the proviso that the alkylating agent is different from the substrate employed, e.g., if the substrate is an olefin, the alkylating agent is not an olefin.

The present invention also includes a process for manufacturing the above-described immobilized Lewis Acid catalyst. In this process functionalized copolymer having monomer units represented by the formula: $-[A]_a-[B]_d-$ is reacted with Lewis Acid catalyst to produce the above-described immobilized Lewis Acid catalyst. A, B, a and d are defined above.

The immobilized catalysts and processes of the present invention offer a number of advantages over conventional cationic catalysts and polymerization processes.

A significant advantage of such immobilized catalysts is that they can be reused. That is, they are usable for multiple polymerization cycles (in the context of a batch process) without regeneration, resulting in substantial cost savings, as well as the elimination of significant amounts of hazardous waste typically generated in conventional Lewis Acid processes. Not only can the immobilized Lewis Acid catalysts of the present invention be employed for multiple polymerization cycles, or on a continuous basis for extended polymerization times, but they can also be easily regenerated after they have been deactivated from prolonged use. The catalyst life (before regeneration is required) will depend upon the reaction conditions, and in particular, contaminants present in the feed streams which may poison the immobilized catalyst. In theory, no regeneration should be needed; however, in practice, poisons are usually present. Surprisingly, even when the immobilized catalysts are partially poisoned, they continue to operate at high efficiencies which are believed to exceed 70%. Not only does this result in significant cost savings, but the environmental impact of the process is minimized.

Another surprising and unexpected advantage of the present invention is that cationic polymerization processes, utilizing the immobilized catalysts, can typically be operated, depending upon the desired molecular weight of the polymer, at relatively higher temperatures, compared to polymerization processes using conventional, but non-immobilized, Lewis Acid catalysts. For example, conventional carbocationic polymerization processes for polybutene require temperatures in the range of −10° C. to +10° C., to produce polymers having $\overline{M}n$ of about 500 to 3,000 requiring extensive refrigeration systems which are costly to operate. The processes of the present invention can be run at +5° C. to +35° C. to produce similar molecular weight polymers. Thus, the immobilized Lewis Acid catalyst appears to be more efficient than catalysts of the prior art.

Yet another surprising and unexpected advantage of the present invention is that gaseous catalysts such as $BF_3$ can now be immobilized. It is now possible to utilize $BF_3$ in a cationic process in a solid form by using the immobilized catalysts of the present invention. The benefits of $BF_3$ can now be realized without the hazards and environmental liabilities that are attendant with the use of gaseous $BF_3$. For example, a by-product of gaseous $BF_3$ in a cationic process is HF. Moreover, it is extremely difficult to recycle gaseous $BF_3$ since the $BF_3$ which is separated from a reactor discharge stream contains gaseous monomers which often dimerize or oligomerize during recycle.

Another advantage of the immobilized catalysts of the present invention is that the catalysts are easy to dispose of in an environmentally advantageous manner. The Lewis Acid catalyst, which typically contains metals, can be stripped from the immobilized catalyst leaving behind a functionalized copolymer, e.g., polyolefin thermoplastic copolymer. The polyolefin thermoplastic copolymer can then be disposed of substantially without metal contamination.

Another advantage of the immobilized catalysts of the present invention is that they can be easily removed from reactors. One method of removal involves simply raising the temperature inside the reactor to a temperature above the melting point of the polymer in which the Lewis Acid is immobilized. The immobilized catalyst then melts and is easily withdrawn from the reactor.

The novel structure of the immobilized catalysts of the present invention can result in enhanced activity for polymerization and alkylation processes when the Lewis Acid catalyst, represented by substituent E in the above formula, is separated by at least one carbon atom and preferably more than one carbon (e.g., 4) from the polymer backbone. Without wishing to be bound by any particular theory, it is believed that orientation of the active catalyst sites is achieved (under the above situation), in such a manner as to facilitate contact of these sites with the monomer being polymerized. The favorable orientation is believed to result from increased mobility of the active catalyst sites when they are located at the end of a flexible carbon atom or carbon chain. Favorable orientation of catalyst sites enhances polymerization and alkylation activity. The novel structure of the immobilized catalysts of the present invention is believed to render each such favorably oriented Lewis Acid catalyst site an active catalyst site. There is little or no interference between neighboring immobilized Lewis Acid catalyst sites. When such interference exists, it can cause the catalysts to effectively "shut-down".

Still another advantage of the Lewis Acid catalysts of the present invention is that they can be used in most polar or non-polar organic solvents. The immobilized catalysts do not require that their use be limited to specific solvents. Useful solvents can include: hexane, heptane, butane, $C_3$–$C_{24}$ hydrocarbyl, and halogenated solvents such as halogenetic hydrocarbons such as methylene chloride, dichloromethane, ethyl chloride and methyl chloride.

Still yet another advantage of the immobilized catalysts of the present invention is that they may be regenerated in situ, e.g., in a reactor by washing with an acid and then treating with at least one Lewis Acid reagent.

The regeneration process is quite simple and can be done at relatively low temperatures (even ambient temperatures) in the reactor vessel without having to remove the immobilized catalyst from the reactor vessel. It is believed that in situ regeneration is not practical with Lewis Acid catalysts supported on inorganic substrates because of the number and nature of steps involved.

Yet another advantage of the immobilized Lewis Acid catalysts of the present invention is that minimal amounts of catalyst residues carry over to the polymer product. In comparison to a "once through" cationic catalyst process, the polymers produced using the immobilized catalysts and processes of the present invention are virtually free of catalyst residues.

The foregoing and other features and advantages of the present invention will become more apparent from the following description.

BRIEF DESCRIPTION OF THE FIGURES

FIG. 2: $^1$H NMR spectrum of PIB prepared by catalyst A(PP-O-AlCl$_2$) at room temperature. FIG. 2A is a magnified scale (100 times) of the spectrum from 4.0 to 6.0.

FIG. 3: $^1$H NMR spectrum of PIB prepared by catalyst C(PB-O-BF$_2$) at 0° C. FIG. 3A is a magnified scale (100 times) of the spectrum from 4.0 to 6.0 ppm.

DETAILED DESCRIPTION OF THE PREFERRED EMBODIMENTS

Figure 1:
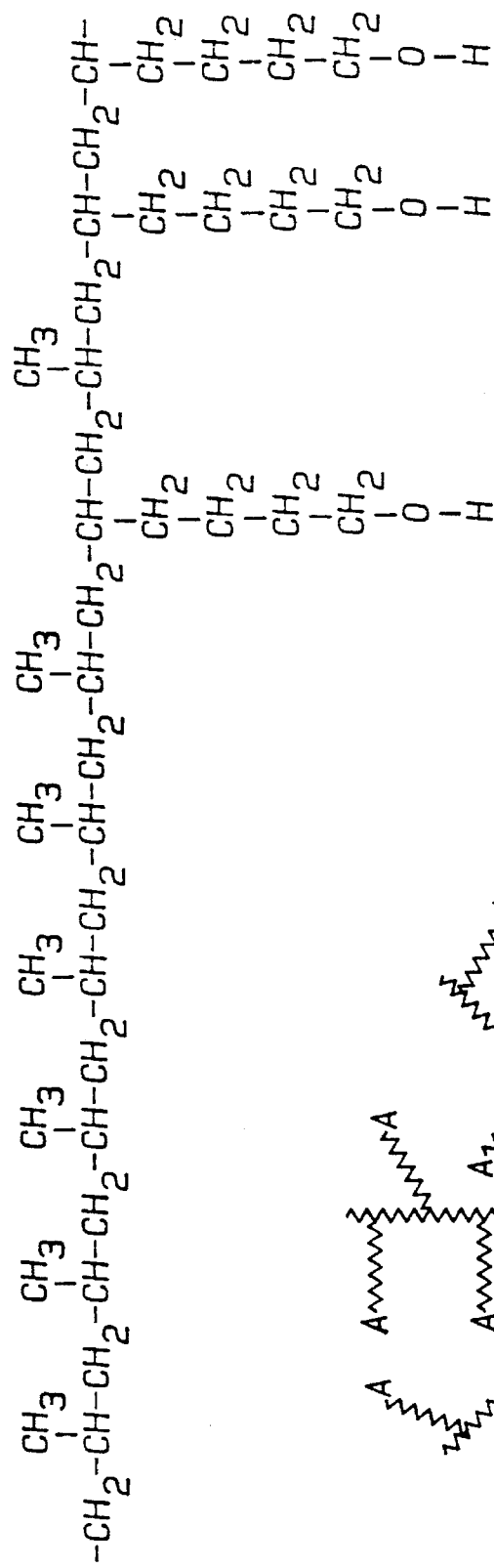
FIG. 1: Formula for "hydroxylated polypropylene" and schematic perspective of the "Brush" arrangement of chains hydroxylated polypropylene. X represents halogen ions, or alkyl halide ions.

Those skilled in the art will be able to appreciate the present invention by the following detailed description of the preferred embodiments. The present invention relates to an immobilized catalysts and process for preparing such a catalyst. The catalyst is particularly useful in the preparation of a variety of homopolymers and copolymers.

The novel immobilized catalysts of the present invention can be used to polymerize a variety of monomers into homopolymers and copolymers, e.g., polyalkenes. The monomers include those having unsaturation which are conventionally polymerizable using carbocationic Lewis Acid catalyst polymerization techniques, and monomers which are the equivalents thereof. The terms cationic and carbocationic are used interchangeably herein. Olefin monomers useful in the practice of the present invention are polymerizable olefin monomers characterized by the presence of one or more ethylenically unsaturated groups (i.e., >C=C<); that is, they can be straight or branched: monoolefinic monomers, such as vinyl ethers, ethylene, propylene, 1-butene, isobutylene, and 1-octene, or polyolefinic monomers. Polyolefinic monomers include cyclic or acyclic, conjugated or non-conjugated, dienes.

Suitable olefin monomers are preferably polymerizable terminal olefins; that is, olefins characterized by the presence in their structure of the group >C=CH$_2$. However, polymerizable internal olefin monomers (sometimes referred to in the patent literature as medial olefins) characterized by the presence within their structure of the group

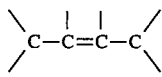

can also be used to form polymer products. When internal olefin monomers are employed, they normally will be employed with terminal olefins to produce polyalkenes which are interpolymers. For purposes of the invention, when a particular polymerized olefin monomer can be classified as both a terminal olefin and an internal olefin, it will be deemed to be a terminal olefin. Thus, 1,3-pentadiene (i.e., piperylene) is deemed to be a terminal olefin for purposes of this invention.

Preferred monomers used in the method for forming a polymer in accordance with the present invention are preferably selected from the group consisting of ethylene and alpha-olefins and typically C$_3$–C$_{25}$ alpha olefins. Suitable alpha-olefins may be branched or straight chained, cyclic, and aromatic substituted or unsubstituted, and are preferably C$_3$–C$_{16}$ alpha-olefins. Mixed olefins can be used (e.g., mixed butenes).

The alpha-olefins, when substituted, may be directly aromatic substituted on the 2-carbon position (e.g., moieties such as CH$_2$=CH—φ— may be employed). Representative of such monomers include styrene, and derivatives such as alpha methyl styrene, paramethyl styrene, vinyl toluene and its isomers.

In addition, substituted alpha-olefins include compounds of the formula H$_2$C=CH—R—X' wherein R represents C$_1$ to C$_{23}$ alkyl, preferably C$_1$ to C$_{10}$ alkyl, and X' represents a substituent on R and C can be aryl, alkaryl, or cycloalkyl. Exemplary of such X' substituents are aryl of 6 to 10 carbon atoms (e.g., phenyl, naphthyl and the like), cycloalkyl of 3 to 12 carbon atoms (e.g., cyclopropyl, cyclobutyl, cyclohexyl, cyclooctyl, cyclodecyl, cyclododecyl, and the like), alkaryl of 7 to 15 carbon atoms (e.g., tolyl, xylyl, ethylphenyl, diethylphenyl, ethylnaphthyl, and the like). Also useful are bicyclic, substituted or unsubstituted, olefins, such as indene and derivatives, and bridged alpha-olefins of which C$_1$–C$_9$ alkyl substituted norbornenes are preferred (e.g., 5-methyl-2-norbornene, 5-ethyl-2-norbornene, 5-(2'ethylhexyl)-2-norbornene, and the like).

Illustrative non-limiting examples of preferred alpha-olefins are propylene, 1-butene, 1-pentene, 1hexene, 1-octene, and 1-dodecene.

Dienes suitable for purposes of the present invention can be straight chain, hydrocarbon di-olefins or cycloalkenyl-substituted alkenes, having about 6 to about 15 carbon atoms, for example:

A. straight chain acyclic dienes, such as 1,4-hexadiene and 1,6-octadiene;

B. branched chain acyclic dienes, such as 5-methyl-1,-4-hexadiene; 3,7-dimethyl-1,6-octadiene; 3,7dimethyl-1,7-octadiene; and the mixed isomers of dihydro-myricene and dihydro-ocinene;

C. single ring cyclic dienes, such as 1,3-cyclopentadiene; 1,4-cyclohexadiene; 1,5-cyclooctadiene and 1,5-cyclododecadiene;

D. multi-ring cyclic fused and bridged ring dienes, such as tetrahydroindene; methyl-tetrahydroindene; dicyclopentadiene; bicyclo-(2.2.1)-hepta- 2,5-diene; alkenyl, alkylidene, cycloalkenyl and cycloalkylidene norbornenes, such as 5-methylene-2-norbornene, 5-propenyl2-norbornene, 5-isopropylidene-2-norbornene, 5-(4-cyclopentenyl)-2-norbornene, 5-cyclohexylidene-2-norbornene, and 5-vinyl-2-norbornene;

E. cycloalkenyl-substituted alkenes, such as allyl cyclohexene, vinyl cyclooctene, allyl cyclodecene, vinyl cyclododecene.

Of the non-conjugated dienes typically used, the preferred dienes are dicyclopentadiene, methyl cyclopentadiene dimer, 1,4-hexadiene, 5-methylene-2-norbornene, and 5-ethylidene-2-norbornene. Particularly preferred diolefins are 5-ethylidene-2-norbornene and 1,4hexadiene.

The polymer and copolymer product which can be manufactured by the process of the present invention are those which can be manufactured by a carbocationic polymerization process and include but are not limited to polyalkenes, such as polyisobutene, poly (1-butene), polyn-butene, polystyrene, ethylene alpha-olefin copolymers, and the like. The term copolymer as used herein is defined to mean a polymer comprising at least two different monomer units.

In particular, the immobilized catalysts of the present invention are especially useful for manufacturing polyisobutene, poly(1-butene) and poly-n-butene from feedstreams containing butene monomers. It is especially preferred to use refinery feed streams containing $C_4$ monomers, commonly referred to as Raffinate I and Raffinate II.

The Lewis Acids which can be immobilized as described herein to make the catalysts of the present invention are defined herein to include any of those Lewis Acids known in the art to be capable of cationically polymerizing olefins in accordance with conventional techniques, and equivalents thereof. Suitable Lewis Acids typically include the halides and alkyl compounds of the elements in Column III B and III A to VI A of the Periodic Table of the Elements including alkyl aluminum, aluminum halides, boron halides, transition metal halides, and combinations thereof. It is particularly preferred to use $AlR_nX_{3-n}$ (n=0–3) wherein R is $C_1$–$C_{12}$ alkyl or aryl and X is a halide, for example, $Al(C_2H_5)_3$, $Al(C_2H_5)_2Cl$, $Al(C_2H_5)Cl2$, and $AlCl_3$, $BF_3$, $BCl_3$, $FeCl_3$, $SnCl_4$, $SbCl_5$, $AsF_5$, $AsF_3$, and $TiCl_4$.

The preferred catalysts are Lewis Acids based on metals from Group III A, IV B and V B of the Periodic Table of the Elements, including, but not limited to, boron, aluminum, gallium, indium, titanium, zirconium, vanadium, arsenic, antimony, and bismuth. The Group III A Lewis Acids have the general formula $R_nMX_{3-n}$, wherein M is a Group III A metal, R is a monovalent hydrocarbon radical selected from the group consisting of $C_1$ to $C_{12}$ alkyl, aryl, alkylaryl, arylalkyl and cycloalkyl radicals; n is a number from 0 to 3; X is a halogen independently selected from the group consisting of fluorine, chlorine, bromine, and iodine. Non-limiting examples include aluminum chloride, aluminum bromide, boron trifluoride, boron trichloride, ethyl aluminum dichloride ($EtAlCl_2$), diethyl aluminum chloride ($Et_2AlCl$), ethyl aluminum sesquichloride ($Et_{1.5}AlCl_{1.5}$), trimethyl aluminum, and triethyl aluminum. The Group IVB Lewis Acids have the general formula $MX_4$, wherein M is a Group IVB metal and X is a ligand, preferably a halogen. Non-limiting examples include titanium tetrachloride, zirconium tetrachloride, or tin tetrachloride. The (group V B Lewis Acids have the general formula $MX_y$, wherein M is a Group V metal, X is a ligand, preferably a halogen, and y is an integer from 3 to 5. Non-limiting examples include vanadium tetrachloride and antimony pentafluoride. The Lewis Acid immobilized in accordance with the present invention will preferably be used during immobilization in gaseous or liquid form, either neat or as a solution using organic solvents. The Lewis Acid may be used singly (i.e., one particular Lewis Acid catalyst) or in combination (i.e., two or more Lewis Acid catalysts).

Typical of Lewis Acid catalysts useful in the practice of the present invention are those having the formula $MX_{m'}(R^{5'})_{p'}$ as illustrated in the Table, wherein m'=(the coordination of number of M)−(p'+1); p'=0 to 3; and, $R^{5'}$ is $C_1$–$C_{12}$ alkyl, $C_6$–$C_{18}$ aryl, $C_7$–$C_{19}$ alkylaryl, and $C_3$–$C_{15}$ cyclic or acyclic.

TABLE

| | | $MX_{m'}(R^{5'})_{p'}$ | | |
|---|---|---|---|---|
| M | X | m' | $R^{5'}$ | p' |
| Sb | Cl | 5 | — | 0 |
| Sb | Cl | 3 | — | 0 |
| Sb | F | 5 | — | 0 |
| Sn | Cl, Br | 4 | — | 0 |
| V | Cl | 4 | — | 0 |
| Be | Cl | 2 | — | 0 |
| Bi | Cl | 3 | — | 0 |
| Zu | Cl | 2 | — | 0 |
| Cd | Cl | 2 | — | 0 |
| Hg | Cl | 2 | — | 0 |
| As | F | 3 | — | 0 |
| AS | F | 5 | — | 0 |
| Nb | F | 5 | — | 0 |
| Ta | F | 5 | — | 0 |
| Ga | Cl, Br | 3 | — | 0 |
| In | Cl, Br | 3 | — | 0 |
| Ti | Br, Cl | 4 | — | 0 |
| Zr | Cl | 4 | — | 0 |
| W | Cl | 5 | — | 0 |
| B | F, Cl, Br, I | 3 | — | 0 |
| Fe | Cl, Br | 3 | — | 0 |
| Al | Cl, Br, I | 3 | — | 0 |
| Al | Cl, Br, I | 3 | $C_1$ to $C_{12}$ alkyl, aryl, alkylaryl, cyclic or acyclic | 0–3 |

Lewis Acids useful as catalysts in carbocationic processes as well as carbocationically polymerizable monomers, and, the polymers produced from such processes are disclosed and described in the following publications: 1) *Cationic Polymerization of Olefins: A Critical Inventory*, Kennedy, Joseph P., John Wiley & Sons, New York (1975), and, 2) *Carbocationic Polymerization*, Kennedy, Joseph P., John Wiley, & Sons, New York (1982).

The immobilized Lewis Acid catalysts of the present invention may be used singly or in combination with cocatalysts. The cocatalysts include materials known in this art such as water, alcohols, Bronsted Acids, for example, anhydrous HF or HCl, and alkyl halides, for example, benzyl chloride or tertiary butyl chloride.

The immobilized catalysts of the present invention are derived from polymers, preferably polyolefin thermoplastic copolymers, having functionalized monomers incorporated into the structure thereof. Such functionalized copolymers can be represented by the following structural formula:

(I) 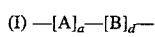

wherein "A" represents unfunctionalized monomer unit, and "B" represents the functionalized monomer unit in the copolymer wherein:

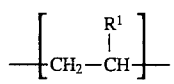

$R^1$ which can be the same or different represents a hydrogen ion (i.e., a proton), an alkyl group, preferably a $C_1$–$C_{24}$ alkyl group, and more preferably $C_1$–$C_4$ alkyl group, or a cyclo alkyl group, preferably a $C_3$–$C_{24}$ cyclo alkyl group, and more preferably $C_5$–$C_8$ cyclo alkyl group;

and,

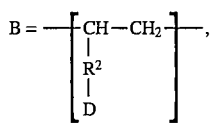

wherein
- D, which represents the functional portion of monomer unit B, can be OH, halide, $NH_2$, $OR^4$, $NHR^3$, OM', or OM"
- $R^2$, which can be the same or different represents an alkylene group, preferably a $C_1$–$C_{24}$ alkylene group, more preferably a $C_3$–$C_5$ alkylene group, a cyclo alkylene group, preferably a $C_6$–$C_{24}$ cyclo alkylene group, an arylene group, preferably, a $C_6$–$C_{18}$ arylene group, or, an alkarylene group, preferably a $C_7$–$C_{30}$ alkylarylene group;
- $R^3$, which can be the same or different represents an alkyl group, preferably a $C_1$–$C_{24}$ alkyl group, preferably a $C_1$–$C_4$ alkyl group, a cyclo alkyl group, preferably a $C$–$C_{24}$ cyclo alkyl group, more preferably a $C_5$–$C_8$ cyclo alkyl group, an aryl group, preferably a $C_6$–$C_{18}$ aryl group, or, an alkaryl group, preferably a $C_7$–$C_{30}$ alkaryl group;
- $R^4$, which can be the same or different represents an alkyl group, preferably a $C_1$–$C_{24}$ alkyl group, more preferably a $C_1$–$C_4$ alkyl group, a cyclo alky group, preferably a $C_3$–$C_{24}$ cyclo alkyl group, an aryl group, preferably a $C_6$–$C_{18}$ aryl group, or, an alkaryl group, preferably a $C_7$–$C_{30}$ alkylaryl group;
- a and d represent the mole % of each respective monomer unit A and B in the functionalized copolymer with "d" representing the sum of b and c in formula III below, the sum of a+d being 100 mole %;
- M' represents alkali metal;
- M" represents alkaline-earth metal.

The functionalized copolymers are typically prepared from borated copolymers which are then treated to replace the boron with functional groups represented by D in formula I in the following manner. More specifically, sufficient amounts (i.e., sufficient to eventually yield the desired amounts and ratios depicted by a, b, and c, in formula III below) of suitable alpha-olefin monomers (A) and suitable borane monomers (B) (as defined hereinafter) can be reacted in a suitable reactor using Ziegler-Natta catalysis under sufficient reaction conditions effective to form a borated, preferably thermoplastic, copolymer. The Ziegler-Natta polymerization may be catalyzed with conventional Ziegler-Natta catalysts or equivalents thereof such as $TiCl_3$ AA/Al(Et)$_3$ or a transition metal halide of Groups IV to VIII of the Periodic Table of the Elements and a cocatalyst which is an alkyl compound including alkyl halides of a metal of Groups I to III of the Periodic Table of the Elements and the like. The abbreviation "AA" used herein is defined to mean "alumina activated". Activated aluminas are widely known and used in adsorption and catalysis because of their large surface area, pore structure, and surface chemistry. They are made by the controlled heating of hydrated aluminas. The activated alumina can be used as a catalyst support. The use of activated alumina as a catalyst support is optional.

Non-limiting examples of the unfunctionalized monomer (A) alpha-olefin monomers which may be used to prepare the functionalized copolymer intermediates useful to make the immobilized catalysts of the present invention include ethylene and $C_3$–$C_{24}$ alpha-olefin monomers, such as, propylene, 1-butene, 1-pentene, 1-hexene, oligomers, co-oligomers, and mixtures thereof. Most preferred are propylene and 1-butene, the alpha-olefin monomers include any monomer, oligomer or co-oligomer polymerizable by Ziegler-Natta catalysis and equivalents thereof.

Suitable borane monomers, from which monomer unit B in formula I is derived, can be prepared by reacting a diolefin having the formula $CH_2=CH-(CH_2)_m-CH=CH_2$ (wherein m is about 1 to 10) with a dialkyl borane solution. Non-limiting examples of diolefins include 1,7-octadiene, 1,5-hexadiene, and 1,4-pentadiene. Non-limiting examples of dialkyl borane solutions include 9-borabicyclo[3,3,1] nonane (hereinafter abbreviated as "9-BBN") in tetrahydrofuran, ethyl ether, methylene chloride, and the like. Borane monomers, useful in the practice of the present invention, and methods of preparation, are disclosed in U.S. Pat. Nos. 4,734,472 and 4,751,276 which are incorporated by reference. Preferred borane monomers useful in the practice of the present invention will have the following formula:

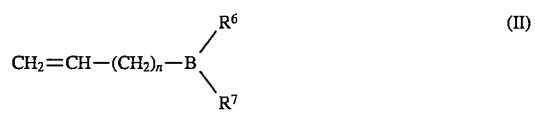

where n=about 3 to 12 and $R^6$ and $R^7$ are the same or different and are alkyl or cycloalkyl groups having about 1 to 10 carbon atoms. Non-limiting examples of borane monomers include B-7-octenyl-9-BBN, B-5-hexenyl-9-BBN, B-4-pentenyl-9-BBN and the like with the most preferred being B-5-hexenyl-9-BBN.

The borated copolymers, preferably thermoplastic copolymers, are functionalized prior to reacting with a Lewis Acid catalyst in order to form the functionalized copolymer from which the immobilized catalysts of the present invention are derived.

It is desireable to functionalize the borated polymer so that the catalyst can be chemically bonded to it. However, if one were willing to accept the attendant disadvantages, the borated copolymer may be reacted directly with Lewis Acid catalyst to form an immobilized catalyst. The functional groups include halides, hydroxyls, carboxylic acid, $NH_2$ and materials having the formula $OR^4$ and $NHR^3$, wherein $R^3$ and $R^4$ are as defined in formula I. It is especially preferred to utilize primary functional groups such as hydroxide and halides. The preparation of the functionalized copolymers of the present invention is typically accomplished by replacement (referred to herein as conversion) of borane groups in the borated copolymer with the groups represented by substituent D in formula I by contact with a conversion agent. Suitable conversion agents include hydrogen peroxide/NaOH, $NH_2Cl$, $NH_2SO_3H$, NaI/chloramine-t-hydrate/ $CH_3CO_2Na$. It is particularly preferred to use hydrogen peroxide/NaOH when the desired functional group is hydroxyl, this latter embodiment being most preferred. The conversion agent and conversion conditions are selected to cleave the boron group from the borated thermoplastic and substitute a functional group in its place. The extent of conversion is determined by the eventual valves of c and b of formula III sought to be impacted to the immobilized catalyst.

Optionally, the functionalized copolymer intermediates of the present invention may be further reacted with an alkyl alkali metal or alkyl alkaline-earth metal compounds to form an alternative functional group more easily reactable with certain Lewis Acids such as $BF_3$, prior to reaction with a Lewis Acid catalyst. These alternative functional groups are depicted in formula I when D is OM' or OM".

Examples of alkyl alkali metal and alkyl alkaline-earth metal compounds include butyl lithium, butyl sodium, butyl potassium, rubidium, and ethyl magnesium. In general, the alkyl alkali metals will have the formula M'R' wherein M' is an alkali metal and R' is a $C_1$–$C_{24}$ alkyl group. The alkali metals (Group I A of the Periodic Table) include lithium, sodium, potassium, rubidium, cesium and francium. In general the alkyl alkaline-earth metal compounds will have the formula M"R" wherein M" is an alkaline-earth metal and R" is a $C_1$–$C_{24}$ alkyl group. The alkaline-earth metals (Group II A of the Periodic Table of the Elements) include calcium, barium, magnesium, strontium and rhodium. Thus, the term functionalized copolymer as used herein is intended to include functionalized copolymers which are further reacted with an alkyl alkali or alkaline-earth metal compounds.

A stoichiometrically idealized reaction sequence for the preparation of a completely functionalized copolymer (i.e. b →0) from alpha-olefin monomers (A) and borane monomers (B), e.g., a functionalized copolymer derived from propylene and having a borane monomer having units completely reacted to have hydroxyl functionality or halide functionality, is as follows:

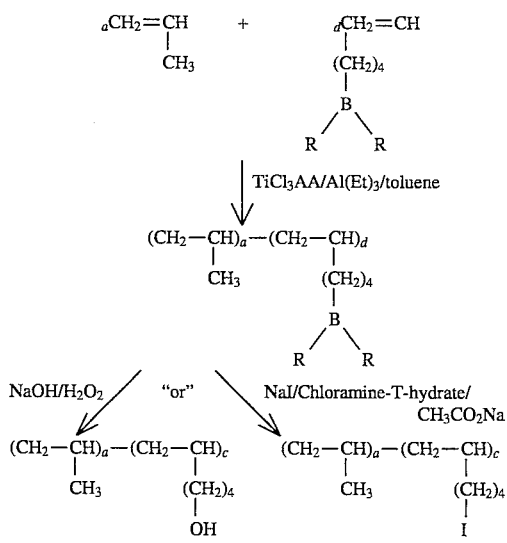

The term "AA" has been previously defined to mean alumina activated.

The functionalized copolymers are typically synthesized to be insoluble in common organic solvents at room temperature and stable under typical cationic polymerization conditions. The functionalized copolymers will typically have a number average molecular weight ($\overline{M}n$) in the range between 300 to 10,000,000, preferably 3,000 to 3,000,000, more preferably 3,000 to 1,000,000, yet more preferably greater than 3,000 to 100,000, even more preferably greater than 5,000 to 50,000 and most preferably greater than 10,000 to 45,000, with a particularly useful and preferred functionalized copolymer having an ($\overline{M}n$) of about 35,000.

The immobilized catalysts of the present invention will typically be prepared from the functionalized copolymer in the following manner.

A sufficient amount of at least one Lewis Acid catalyst, preferably in excess, is mixed with a sufficient amount of a functionalized copolymer in a suitable reactor vessel under suitable reaction conditions effective to react the functionalized copolymer with the Lewis Acid catalyst thereby producing the immobilized catalyst as defined in formula III. By "excess" is meant a molar ratio of Lewis Acid catalyst to functional groups of about more than 1:1, preferably 5:1.

The reaction is preferably carried out at a temperature of about 20° C. to 110° C. although the reaction temperature may range from about –50° C. to 200° C. The reaction is preferably carried out by dissolving the Lewis Acid catalyst in a thoroughly dried, inert solvent selected from any suitable solvents including alkanes, aromatic solvents and alkyl halides; however, the Lewis Acid catalyst may be in the gas phase or liquid phase when reacted with the functionalized copolymer. The preferred solvents will be good solvents for the Lewis Acid catalyst and will also be relatively good solvents (swellable) for the polymer substrate to maximize the penetration of reagent into the polymer matrix. Immobilized catalysts are not readily extractable by the solvent and by reaction media.

The resulting immobilized Lewis Acid catalysts of the present invention can be described as comprising polymer having at least one Lewis Acid immobilized within the structure thereof, said polymer having monomer units represented by the structural formula:

(III) —[A]$_a$—[B]$_b$—[C]$_c$— wherein a+b+c represents the respective mole % of monomer units A, B, and C in said polymer with the sum of a+b+c preferably being about 100%, and wherein a represents about 1 to about 99 mole % b represents about 0 to about 50 mole % c represents about 1 to about 99 mole %

A, B, are as described in connection with formula I; C is selected from the group consisting of:

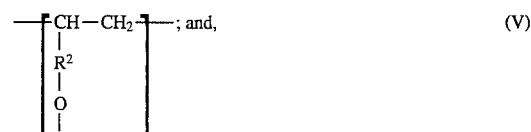

combinations thereof.
wherein:

E is the residue of the reaction of a Lewis Acid with the D functional substituent in monomer unit B; and $R^2$ is as described in formula I.

When monomer Unit B in formula I remains unconverted, the D substituent remains unchanged and monomer unit B in formula I becomes monomer unit B in formula III. In contrast, when D in monomer unit B is acted upon by the conversion agent, monomer unit B becomes monomer unit C by replacement of substituent D with substituent E (i.e., the Lewis Acid residue).

As indicated above, E is defined as being the residue of the reaction of a Lewis Acid Catalyst with the D functional group of monomer unit B. It will be appreciated by those skilled in the art that the precise formula for E will vary depending upon the Lewis Acid catalysts used and the functional groups present on the functionalized copolymer.

The ratio of a:c in formula III will typically be about 1:1 to about 100:1, more typically about 5:1 to about 100:1, and preferably about 20:1 to about 50:1. The ratio of b:c will typically be about 0.1:1 to about 20:1, more typically about 0.1:1 to about 10:1, and preferably about 0.5:1 to about 5:1. Where all of the D reacts to form E, than b becomes 0. In a preferred embodiment substantially all of the D is reacted to form E.

Although the immobilized catalysts of the present invention comprise a Lewis Acid chemically reacted with and chemically bonded to a copolymer backbone, there is at least one instance wherein the bond is a pi ($\pi$) complex. Specifically, when D is hydroxyl and the Lewis Acid intended to replace D is $BF_3$, then the $BF_3$ will form a pi ($\pi$) bond with the copolymer backbone by complexing with hydroxyls contained in the copolymer.

The immobilized Lewis Acid catalysts of the present invention will typically have, prior to any processing, a particle-like structure wherein each particle consists of an immobile copolymer backbone and substituent Lewis Acid. While not wishing to be bound to any particular theory, it is believed that the Lewis Acid tends to predominate on the surface of the particle, while the interior of the particle will tend to consist primarily of immobile crystalline copolymer. More specifically, when the borated copolymer intermediate is prepared prior to forming the functionalized copolymer, the difference in reactivity between the borane comonomer (lower activity) and olefin comonomer (higher activity) is believed to result in a predominantly block or sharply tapered copolymer. It is believed to be important that the non-boron containing block be crystalline, since as the block crystalizes, it forms a particle having a crystalline core. During crystallization the boron monomer block migrates or orients at the particle surface, thereby ensuring eventual predominance of the Lewis Acid sites at the surface of the particle. This orientation phenomena is maintained even upon melt extrusion of the immobilized catalyst and becomes even more pronounced in the final catalyst due to the high polar character of the Lewis Acid. This structure results in catalysts having good polymerization activity and high surface area. Reference is made to FIG. I showing the formula and speculated morphologic arrangement of hydroxylated polypropylene.

The immobililzed catalysts of the present invention may be used for prolonged periods of time and then regenerated. The catalyst may even be regenerated in situ in a reactor if so desired. The catalysts are easily regenerated. The regeneration process is preferably accomplished by first washing the immobilized catalyst while in the reactor vessel with any Bronsted acid such as HCl, $H_2SO_4$ and the like, and then treating the immobile, plastic phase of the immobilized catalyst with Lewis Acid reagents. Optionally, after the acid wash, and prior to treatment with the Lewis Acid reagent, the immobilized catalyst is treated with an alkyl alkali metal or an alkyl alkaline-earth metal compound to form an intermediate salt which is then treated with Lewis Acid catalyst reagent. Typically, these Lewis Acid reagents will consist of Lewis Acid catalyst solutions in organic solvents such as toluene, methylene chloride and the like. Preferably the strengths of the Lewis Acid catalyst solution will range from about 10 wt. % to about 50 wt. %. It is preferred to use an excess of Lewis Acid catalyst reagent in the regeneration process. By "excess" is meant from two to five times the mole ratio of catalyst to functional groups. Rather than use solutions of Lewis Acid catalysts, the Lewis Acid catalyst may be used in a liquid or gaseous form.

The immobile thermoplastic is stable under cationic reaction conditions; it is insoluble in hydrocarbon solvents below 500° C. and has high mechanical strength. One particularly preferred form of the immobilized catalyst is finely divided particles. The finely divided particles can be obtained using various particle size reduction processes including freezing and pulverizing, and conventional particle size reduction processes.

While the polymer backbone of the immobilized catalysts of the present invention can exist as random copolymers, block copolymers, tapered copolymers, graft copolymers and alternating copolymers, it is particularly preferred to use immobilized catalysts of the present invention having a monomer distribution which is described as block or predominantly tapered. It will be appreciated by those skilled in the art that the monomer configuration of the copolymer will affect its chemical and physical properties. The term copolymer as used herein is defined to mean a polymer having two or more monomeric units. The monomeric configuration in the polymer backbone is determined by a number of factors well known to those skilled in this art, including reactivity ratios, rates of monomer addition, sequencing, reactor design, reaction conditions and the like.

As indicated above, it is believed to be highly advantageous that the immobilized catalysts of the present invention exhibit crystallinity. The degree of crystallinity is directly related to the molar amount "a" of the monomer component [A] of formula I. Because of the advantages of crystallinity, it is desired to select monomer type and polymerization conditions conducive to the formation of thermoplastic copolymer.

Typically the value of "a" will range from about 1 to 99 mole %, more typically about 25 to 99 mole %, and preferably about 50 to 99 mole % of the immobilized catalyst backbone. It will be appreciated by those skilled in this art that the degree of crystallinity will increase with increasing mole % of [A]. It will also be appreciated that the physical characteristics of the immobilized catalysts of the present invention will be related, at least in part, to their degree of crystallinity. For example, a mole % of [A] greater than 50% will typically result in a solid phase immobilized catalyst.

There are various methods of determining when the desired crystallinity of the immobilized catalysts of the present invention is achieved. One indirect method is to react the boron in the boron-containing copolymer (prior to functionalization) with a Lewis base. The weight increase is indicative of the amount of boron present and the amount of thermoplastic monomer units [A] present in the copolymer may then be calculated. As previously mentioned, when the mole % of [A] is about 50% or greater, the immobilized catalysts will exhibit desired crystallinity. In addition to the mole % of [A], the crystallinity is a function of the amount of boron sites on the surface which can be functionalized to react with a Lewis Acid catalyst (i.e., an increase in the borated precursor of monomer unit B will decrease the amount of monomer unit A in the polymer). The number of surface boron sites can be measured by a variety of conventional analytical techniques. It is preferred to use Boron NMR. In a preferred embodiment, most of the Lewis Acid catalyst reactable sites depicted by D in formula I will be on the surface of the functionalized thermoplastic copolymer.

One particularly preferred method of determining crystallinity is to measure the DSC (Differential Scanning Calorimetry) curve of a sample of the immobilized Lewis Acid catalyst. This will give the melting point of the sample, and, from the intensity of the peak of the curve, the crystallinity can be calculated.

Access to any boron which may be present in the interior of the precursor copolymer particles by the conversion agent is controlled by using swellable solvents such as THF. By swellable solvents is meant a solvent which will diffuse into a functionalized copolymer. Examples of such solvents include methylene chloride and toluene.

As previously mentioned, it is believed that, more likely than not, the crystalline segments of the immobilized catalysts of the present invention tend to form an inner immobile crystalline phase while the Lewis Acid sites and any other functionality which may be present tend to be oriented at the particle surface. Thus, the immobilized catalyst retains at least some of the original physical properties of a pure crystalline polymer. For example, the crystallinity and thermal stability of an immobilized catalyst of the present invention will be similar to that of the purely thermoplastic crystalline copolymer.

In addition, as previously mentioned, the immobilized catalyst of the present invention may be used in particle form. Typically, in a polymerization reaction the particle size of the immobilized catalyst will be about 0.001 mm to about 20.0 mm, more typically about 0.01 mm to about 10.0 mm, and preferably about 0.01 mm to about 1.0 mm.

The catalyst can be formed to fine particles by suitable means. Preferably, the catalyst can be frozen by suitable means, such as liquefied compounds which are gaseous at ambient temperature such as nitrogen. The frozen catalyst can be comminuted to a fine particle size, preferably having a distribution of from about 0.001 mm to about 1.0 mm and more preferably from about 0.01 mm to about 0.5 mm. It has been found that the use of catalyst in the preferred range results in polymer of the present invention having greater terminal unsaturation and thereby greater reactivity. Particularly preferred polymer having greater terminal unsaturation are polybutenes including poly-n-butenes and polyisobutylene.

The catalyst may be processed according to conventional thermoplastic processing techniques such as molding, extruding, forming and coating to produce various catalyst structures having optimal surface areas. The catalysts may be molded into various shapes such as column packing rings and the like. It is contemplated that the catalysts of the present invention can be coated onto a variety of supporting substrates such as metal, ceramic, plastics including thermoplastic, glass, fiberglass, carbon, graphite and the like. It is further contemplated that these catalysts can be extruded or molded onto such substrates.

In a typical molding process, the immobilized catalyst is fed to a molding machine having a heating means and cooling means. The immobilized catalyst is heated to a state where it is flowable (e.g., at or above glass transition temperature) and it is transported by the feed means to a mold having cavities therein. The plastic is transported under sufficient heat and pressure to fill in the cavities, cooled, and removed, thereby retaining the shape of the cavities.

The coatings may be any conventional coating and equivalents thereof including, but not limited to, liquid polymer melts or solution polymer coatings. The coatings may also comprise dispersions, both aqueous and nonaqueous, enamels, lacquers, dry powders, and aqueous or organic electrodeposition compositions. The coatings may be cured in conventional manners including heating, drying, crosslinking, and radiation. The coatings will contain conventional components and incipients such as solvents, resins, binders, dispersants and optionally pigments, mixing and flow agents, curing agents and the like. The coatings are prepared using conventional mixing, dispersing, and particle size reduction processes and equipment such as stirred tanks, ball mills, shot mill, high shear mixers and the like.

It is contemplated that the surfaces of reactor vessels and process piping and equipment may be coated with the immobilized catalysts of the present invention. In addition, reactor components such as packing may be coated. Any conventional coating processes and equivalents thereof nay be used including, but not limited to, spraying, dipping, powder coating, brushing, rolling, electrodeposition and the like.

Coatings, manufacturing processes, application processes, and, plastics processing methods, products and process equipment are disclosed in Kirk-Othmer Encyclopedia of Chemical Technology, Third Edition, John Wiley & Sons, New York (1982).

The carbocationic polymerization process of the present invention may be carried out as a continuous, semi-continuous or batch process. The reactors which may be utilized in the practice of the present invention include conventional reactors and equivalents thereof such as batch reactors, stirred tank reactors, fluidized bed reactors, and continuous tank or tubular reactors and the like. As previously mentioned, the process may be continuous, batch or semi-continuous and combinations thereof.

The reactor will contain sufficient amounts of the immobilized catalyst of the present invention effective to catalyze the polymerization of the monomer containing feedstream such that a sufficient amount of polymer having desired characteristics is produced. The reaction conditions will be such that sufficient temperature, pressure, and residence time are maintained effective to produce the desired polymers having the desired characteristics.

Typically, the catalyst to monomer ratio utilized will be those conventional in this art for carbocationic polymerization processes. In the practice of the present invention, the catalyst to monomer ratio is selected based on the ratio of residue E to monomer being polymerized. In the practice of the present invention the mole ratio of the residue E to the monomer will typically be about 1/5000 to about 1/50, more typically about 1/1000 to about 1/100, and preferably about 1/500 to about 1/200. This mole ratio will be calculated by determining the number of Lewis Acid catalyst sites in the immobilized Lewis Acid catalyst. This can be done by using conventional analytic testing techniques such as elemental analysis, NMR (e.g., aluminum NMR) and absorption spectroscopy. Once the number of Lewis Acid sites per unit of immobilized catalyst is known, the mole ratio is calculated in a conventional manner.

The reaction temperature will typically be maintained to about 50° C. to about −30° C., more typically about 40° C. to about −20° C., and preferably about 30° C. to about −10° C. The reaction pressure will typically be about 200 k PA to about 1600 k PA, more typically about 300 to about 1200, and preferably about 400 to about 1000. The degree of polyitierization of the monomer feedstream will typically be about 6 to about 10,000, more typically about 10 to about 2,000, and preferably about 10 to about 500.

The yield of polymer is dependent on reaction time and catalyst particle size. The cationic polymerization of a polymer such as isobutylene is related to the availability of catalyst group (i.e. E). The larger the immobilized catalyst particle, the smaller the surface area of the catalyst which is available. Small surface areas, preferably less than 1 millimeter diameter particles are preferred for increased reaction rate. Nevertheless, the extent of reaction will continue to be high but with larger particles with the total reaction taking a longer period of time.

The molecular weight of the polymer produced, preferably a polybutylene using a polyolefin immobile catalyst of the present invention has been found to be higher than using the corresponding Lewis Acids from which the immobilized catalysts are derived. For example, conventional Lewis Acids such as $AlCl_3$, ethyl aluminum dichloride, diethyl aluminum chloride, and boron trifluoride used as catalysts for the reaction of polybutenes results in lower molecular weight polymer than if they are immobilized. While not wishing to be bound to any theory, it is speculated that the relatively higher molecular weight of polymer made using the immobilized catalyst of the present invention may be due to slow chain transfer because of stable carbocation in the immobilized catalyst. The alkoxide ligand denotes y-electron density to aluminum active site and stabilizes the propagating center. This affect is very significant for catalysts having a immobilized structural unit of $-O)_2AlEt$ species. As illustrated in the examples specific immobilized catalysts having at least some immobilized structure of aluminum ethyl or aluminum diethyl result in higher molecular weight polymer. Therefore, the molecular weight of the polymer of the present invention depends on temperature, solvent type, and catalyst type.

A preferred combination of higher temperature and specific catalyst structure derived from a diethyl aluminum or triethyl aluminum type catalyst and a polar solvent results in higher molecular weights. A preferred immobilized catalyst to achieve higher molecular weights is one using a polar solvent such as methylene dichloride, at a temperature of greater than −45° C. and preferably greater than −20° C. and most preferably at a temperature range of −30° to +10° C. An immobilized catalyst can be derived from a dialkylhalide Lewis Acid. Diethyl aluminum chloride is preferred. Polymer using these preferred features have a mol(Bcular weight of greater than 10,000 and preferably greater than 20,000 number average molecular weight.

In specific embodiments of the present invention cationically polymerized polymer having controlled and increased terminal unsaturation can be produced.

FIG. 2 shows the $^1H$ NMR spectrum of polyisobutylene (PIB) which was prepared by using immobilized $AlCl_3$ with a copolymer of propylene and 1-hexenyl-6-ol (PP-O-$AlCl_2$) at room temperature. The overall spectrum is similar to those of found PIB prepared by soluble Al catalysts, such as $AlCl_3$, $EtAlCl_2$, $Et_2AlCl$, as well as $C_5$-O-$AlCl_2$ (1-hexenyl-6-$AlCl_2$) catalyst. Two major peaks are at 0.95 and 1.09 ppm, due to —$CH_3$ and —$CH_2$ protons in PIB polymer. There are some weak peaks located in the olefinic region, between 4.5 and 6.0 ppm. The unsaturated double bond in polymer chain is the evidence of proton chain transfer reaction during the polymerization. In conjunction with the gel permeation chromatography (GPC) molecular weight studies, the integrative intensity of olefinic region implies an average of a double bond per polymer chain. In detail, (FIG. 2A), there are two quartets at about 5.4 and 5.2 ppm and two singlets at about 4.9 and 4.6 ppm. The singlets at 4.9 and 4.6 ppm are indicative of two types of nonequivalent vinylidene hydrogens which may be located at the end of polymer chain. The quartets at 5.4 and 5.2 ppm are the olefinic hydrogens coupled to methyl group, which are due to the internal double bonds. The $^1H$ NMR peak assignments are summarized in Table I.

TABLE I

| Olefin Structures from $^1H$ NMR Shifts | |
|---|---|
| Structure | Observed $^1H$ Chemical Shifts |
| ```
     C       C
     |       |
  —C—C—C—C=C
     |
     C
``` | 4.88, 4.66 singlet |

TABLE I-continued

| Olefin Structures from $^1H$ NMR Shifts | |
|---|---|
| Structure | Observed $^1H$ Chemical Shifts |
| ```
     C       C
     |       |
  —C—C—C=C—C
     |
     C
``` | 5.15 singlet |
| ```
     C           C
     |           |
  —C—C—C—C—C—C—C
     |   ||
     C   C
          \
           C
``` | 5.18 quartet |
| ```
     C           C
     |           |
  —C—C—C—C—C—C—C
     |   ||
     C   C
         /
        C
``` | 5.38 quartet |

A significantly high amount of internal double bonds with various structures are present, which indicates carbocationic isomerization taking place by Lewis acid catalyst after the polymerization reaction. This olefin isomerization behaviors are similar to those in the soluble Al catalyst systems, such as $AlCl_3$ $EtAlC_2$, $Et_2AlCl$.

A different $^1H$ NMR spectra of PIB was observed by using immobilized catalyst $BF_3$ with a copolymer of butene-1 and 1-hexenyl-6-ol (PB-O-$BF_2$) at 25° and 0° C. The chemical shifts in double bond region consist of two major singlets at 4.9 and 4.6 ppm, corresponding to terminal double bond, and two small peaks at about 5.15 ppm, corresponding to internal double bond. (FIGS. 3, 3A) Comparing the integrated intensities between olefinic peaks, shown in FIG. 3(A), the PIB prepared at 0° C. contains more than about 85% of terminal double bonds than internal double bonds. The reason for such a high percentage of terminal double bonds in PB-O-$BF_2$ polymerization is not clear. The proton transfer reaction (β-proton elimination) is the termination step which can form both terminal and internal double bond as shown in the following equation.

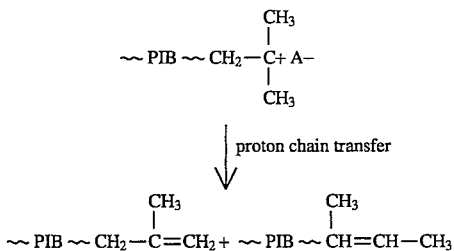

The elimination of proton from two terminal methyl groups are statistically favorable. However, the elimination of proton from the last methylene unit forms a thermodynamically stable internal double bond. Theoretically, the maximum percentage of terminal double bonds in the final PIB can not be more than 75%. It is speculated that some effects from the substrate polymer may play a role to control the termination reactions and to avoid any isomerization reactions. A control experiment, using $C_5$-O-$BF_3$ (1-hexenyl-6-$BF_2$) soluble catalyst under the same reaction condition, resulted in more than 30 mole percent of internal double bonds.

The PIB product with high concentration of terminal double bonds is a very desirable molecular structure, called "reactive PIB", which can be easily functionalized under mild reaction conditions. The terminal double bonds react more easily with maleic anhydride than the internal double bonds. Internal unsaturated PIB preferably undergo a halogenation reaction before maleic anhydride reaction. Known "reactive PIB" have a low number average molecular weight (500–2000 g/mole) PIB with 60–70% terminal (or external) double bonds, which is prepared by $BF_3$ catalyst. Reference is made to U.S. Pat. No. 4,605,808 hereby incorporated by reference for a review of the reactivity of terminal unsaturation. The polymer of the present invention, preferably PIB, preferably contains at least 60, preferably at least 70, more preferably at least 80 percent of terminal double bonds.

The feedstock stream to this process may be at least one pure or mixed monomer feedstream or combinations thereof. Additionally, the monomer feedstream may be mixed with solvents such as hexane, methylene dichloride and the like. A preferred feedstock to this process may be a pure or mixed refinery butene stream containing one or more of 1-butene, 2-butene (cis and trans), and isobutene. The preferred feedstocks (preferred on an availability and economic basis) are available from refinery catalytic crackers and steam crackers. These processes are known in the art. The butene streams typically contain between about 6 wt. % and about 50 wt. % isobutylene together with 1-butene, cis- and trans-2-butene, isobutane and less than about 1 wt. % butadiene. One particularly preferred $C_4$ feedstream is derived from refinery catalytic or steam cracking processes and contains about 6–45 wt. % isobutylene, about 25–35 wt. % saturated butanes and about 15–50 wt. % 1- and 2-butenes. Another preferred $C_4$ feedstream is referred to as Raffinate II characterized by less than about 6 wt. % isobutylene. The monomer feedstream is preferably substantially anhydrous, that is, it contains less than 50 ppm, and more preferably less than about 30 ppm, and most preferably less than about 10 ppm, by weight of water. Such low levels of water can be obtained by contacting the feedstream, prior to the reactor, with a water absorbent (such as $CaCl_2$, $CaSO_4$, molecular sieves and the like) or by the use of distillation drying. Suitable molecular sieves include 4 to 8 US mesh 3 Angstrom molecular sieves.

The monomer feedstream is typically substantially free of any other impurity which is adversely reactive with the catalyst under the polymerization conditions. For example, the monomer feed to an immobilized catalyst should be preferably substantially free of bases (such as caustic), sulfur-containing compounds (such as $H_2S$, COS, and organomercaptans, e.g., methyl mercaptan, ethyl mercaptan), N-containing compounds, and the like. Most preferably, the monomer feed contains less than about 10 ppm by weight of sulfur-containing compounds, calculated as elemental sulfur, less than about 10 ppm by weight of N-containing compounds (calculated as elemental N), and less than about 10 ppm by weight of caustic, calculated as NaOH. Such low levels of base, sulfur and nitrogen impurities can be obtained by conventional techniques, as by the use of caustic to remove sulfur- and nitrogencompounds from a refinery $C_4$ stream, followed by water washing to remove caustic, drying with any of the above water absorbents, hydrogenating to remove $C_4$–$C_5$ diolefins (e.g., butadienes) (to a level of below 1 wt. %, preferably <1,000 ppm by weight) and cooling the resulting purified $C_4$ stream for feed to the tubular reactors of the present invention, after admixing the selected cocatalyst therewith.

The monomer feedstream is typically substantially free of aromatic compounds, such as benzene, toluene, xylene, naphthalene and other aromatic solvents (e.g., <10 ppm aromatic compounds) to avoid the resultant reactive degradation of the immobilized catalyst. Therefore, use of an aromatic solvent is not envisioned in this process.

It is contemplated that this process may be used to polymerize and copolymerize various monomers from pure or mixed feedstreams such as isobutenes from pure or mixed streams (containing other butenes); n-butenes from streams containing small amounts of isobutenes (e.g., less than about 5 wt. %); and sequentially isobutene from a mixed stream, and then n-butenes. It is also contemplated that this process may be used to copolymerize various monomers including 1-butene, ethylene and hexane.

Other design parameters such as recycle rate and % diluents are matters of choice in this instance and may be readily determined by one having ordinary skill in chemical engineering.

A material acting as a cocatalyst (or promoter) may optionally be added to a monomer feedstock before that feed is introduced to a reactor or it may be added separately to the reactor, e.g., to the catalyst bed. A variety of conventional cocatalysts or equivalents can be used including $H_2O$, hydrogen halides, ROH and RX wherein X=halides and R=$C_2$–$C_{24}$ secondary or tertiary alkyl and the like. For example, gaseous, anhydrous HCl, may be employed as a cocatalyst. The HCl will be employed in a catalytically effective amount, which amount will generally range from about 50 to 5,000 ppm by weight of the monomer feed, preferably 50 to 500 ppm (e.g., 70 to 200 ppm) by weight of the monomer feed when the monomer feed comprises >5 wt. % isobutylene, and preferably from about 100–5,000 ppm (e.g., 400–3,000 ppm) by weight when the feed comprises n-butenes and <5 wt. % isobutylene. If anhydrous HCl is added to the feedstream containing isobutene, t-butyl chloride is formed before contact with the solid catalyst. This has been found to promote the polymerization of the isobutene. Water, in a catalytic amount, may be added to the feedstock but is not preferred since it has a tendency to cause physical deterioration of the catalyst with time. Alcohols, such as the preferred lower alkanols (e.g., methanol), may also be added. As has been pointed out above, the monomer feed is preferably anhydrous, and the reaction mixture is also preferably substantially anhydrous (that is, typically contains <50 ppm, more typically <30 ppm, and most preferably <10 ppm, by weight water based on the monomer feed).

The characteristics of the polymeric product of the present process will be dependent upon the monomer feedstream, the particular immobilized catalyst, the optional cocatalysts, and the reaction conditions. Typically, $\overline{M}n$ of the polymeric product will range from about 300 to about 1,000,000, preferably 300 to about 500,000, more preferably about 500 to about 100,000, and most preferably about 500 to about 25,000 gm/mole. The molecular weight distribution ($\overline{M}w/\overline{M}n$) will typically range from about 1.1 to about 8.0, more typically about 1.8 to about 3.0, and preferably about 1.8 to about 2.5. The molecular weight of the polymer produced according to the process of the present invention is inversely proportional to the reaction temperature, and, surprisingly and unexpectedly, a relatively high molecular weight polymer can be produced at or near room temperature. In addition, all molecular weights of polymers can usually be produced at relatively lower temperatures by using the immobilized catalysts of the present invention when compared with conventional carbocationic catalysts.

The product mixture may be withdrawn from the reactor and subsequently treated (e.g., by depressuring into a suitable gas/liquid separation drum or other vessel) for separation of gaseous components therefrom (e.g., unreacted monomer such as isobutene, butene, butane, and isobutane). If desired, these separated gases can be compressed, cooled and recycled to the feed inlet to the tubular reactor, although the need for such recycling is minimized or avoided by use of the process of this invention in view of the high olefin conversions which are obtainable. A portion of the liquid reactor effluent can be recycled to the feed to dilute the content of the monomers in the feed to the reactor, if necessary. Preferably, the monomers fed to the tubular reactor are substantially free of monomers recycled from the tubular reactor effluent. Therefore, the monomer feedstream is preferably contacted with the catalyst in the process of this invention on a once-through basis.

In addition to polymerization processes, the immobilized catalysts of the present invention may also be used in alkylation processes. As is known in this art, alkylation may be simply described as the addition or insertion of an alkyl group into a substrate molecule. Of particular interest is the alkylation of aromatic, hydroxy aromatic, olefin, alkyl halide and alkane substrates and mixtures thereof. The hydroxy aromatic and aromatic compounds include, but are not limited to, toluene, xylene, benzene and phenol. Suitable alkylating agents include olefin, alkane, alkyl halide and mixtures thereof. The composition of each class of alkylating agent is as described in conjunction with the corresponding substrate class of compounds subject to the proviso that the alkylating agent class be different from the substrate class employed.

The hydroxy aromatic substrate compounds useful in the preparation of the alkylated materials of this invention include those compounds having the formula:

wherein Ar represents

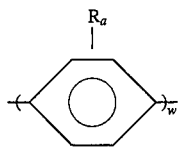

and z is an integer from 1 to 2, w is an integer from 1–3, a is 1 or 2 and $R_a$=$C_1$–$C_{24}$ alkyl.

Illustrative of such Ar groups are phenylene, biphenylene, naphthalene and the like.

The aromatic substrate compounds useful in the preparation of the alkylated materials of this invention include those compounds having the formulas:

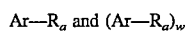

wherein R is H or $C_1$–$C_{24}$ alkyl and wherein Ar represents:

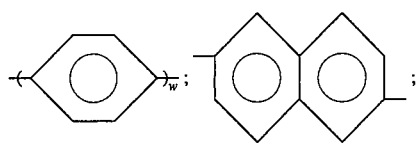

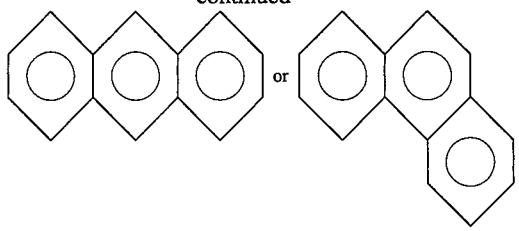

wherein a is one or two and wherein R=$C_1$–$C_{24}$ alkyl, $C_3$–$C_{24}$ cyclic, $C_6$–$C_{18}$ aryl, $C_7$–$C_{30}$ alkylaryl, OH, or H and w=1–3.

Illustrative of such Ar groups are benzene, phenylene, biphenylene, naphthalene, and anthrocene.

The alkane substrate which can be alkylated using the processes of the present invention include those having the formula $C_nH_{2n+2}$ including but not limited to butane, ethane, propane, methane, hepane, heptane, octane, nonane, decane and the like.

The alkyl halide substrate will typically have the formula $R^8X_r$ wherein $R^8$=$C_1$–$C_{24}$ alkyl, $C_3$–$C_{24}$ cyclic, $C_6$–$C_{18}$ aryl, or $C_7$–$C_{30}$ alkylaryl and X=halide including Cl, F, Br and I, and r is a number from 0 to 4. Examples of alkyl halides include t-butyl chloride, ethyl chloride, n-butyl chloride and 1-chlorohexane.

The olefin substrate useful in the preparation of the alkylated materials of this invention, and which may also be alkylated, are known in the art and include those compounds having 2 to 200 carbon atoms. The olefins may be monomers, oligomers or copolymers or polymers including copolymers. Nonlimiting examples which are illustrative of such compounds include ethylene, propylene, butene, $C_2$–$C_{24}$ mono or diolefin, polybutene, poly-n-butene, polypropylene, low molecular weight polyethylene, ethylene alpha-olefin copolymers, and combinations thereof and oligomers derived from $C_2$–$C_{24}$ olefins.

The selected olefins, alkanes, alkyl halides, aromatic or hydroxy aromatic compound are contacted with a suitable alkylating agent in the presence of a catalytically effective amount of at least one acidic alkylation catalyst under conditions effective to alkylate the substrate selected. The alkylation catalyst comprises the immobilized catalysts of the present invention. Also useful as catalysts are preformed complexes (or complexes formed in situ) of the immobilized catalyst with aromatics such as benzene, toluene and the like.

The substrate and alkylating agent will generally be contacted under reaction conditions, including mole ratio, temperature, time and catalyst ratio sufficient to alkylate the substrate. The substrate will be generally contacted in a molar ratio of from about 0.1 to 10, preferably from about 1 to 7, more preferably from about 2 to 5, moles of the substrate per mole of the alkylating agent. Conventional ratios of alkylating agent will typically be used. The ratio will typically be about 0.5 to 2:1, more typically about 0.8 to about 1.5:1, and preferably about 0.9 to about 1.2:1. The selected catalyst can be employed in widely varying concentrations. Generally, the catalyst will be charged to provide at least about 0.001, preferably from about 0.01 to 0.5, more preferably from about 0.1 to 0.3, moles of catalyst per mole of substrate charged to the alkylation reaction zone. Use of greater than 1 mole of the catalyst per mole of substrate is not generally required. The reactants can be contacted with the immobilized catalyst employing any conventional solid-liquid contacting techniques, such as by passing the reactants through the resin (e.g., in a catalyst bed or through the resin (e.g., in a catalyst bed or through a membrane impregnated or otherwise containing the catalyst or through a conduit having deposited thereon a coating or layer of the catalyst) and the upper limit on the moles of catalyst employed per mole of substrate compound is not critical.

The temperature for alkylation can also vary widely, and will typically range from about 20° to 250° C., preferably from about 30° to 150° C., more preferably from about 50° to 80° C.

The alkylation reaction time can vary and will generally be from about 1 to 5 hours, although longer or shorter times can also be employed. The alkylation process can be practiced in a batchwise, continuous or semicontinuous manner.

Alkylation processes of the above types are known and are described, for example, in U.S. Pat. Nos. 3,539,633 and 3,649,229, the disclosures of which are hereby incorporated by reference.

Generally, the % conversions obtained in the alkylation according to the present invention will be greater than about 50%, e.g., from 70 to 98%, and preferably from 80 to 95%, based on the percentage of the alkylating agent charged which reacts. The precise conversion obtained will depend on the $\overline{M}n$ of the substrate, e.g., polyalkene, the alkylation temperature, reaction time and other factors, and conversions will generally decrease somewhat as polyalkene $\overline{M}n$ increases. The alkylation process of this invention is particularly beneficial for olefins having $\overline{M}n$ of from about 300 to 5,000, preferably 300 to 3,000.

It will be understood that when the alkylating agent is a polyalkene it can be charged to the alkylation reaction zone alone or together with (e.g., in admixture with) other polyalkenes alkylating agents derived from alkenes having from 1 to 20 carbon atoms (butene, pentene, octene, decene, dodecene, tetradodecene and the like) and homopolymers of $C_3$ to $C_{10}$, e.g., $C_2$ to $C_5$, monoolefins, and copolymers of $C_2$ to $C_{10}$, e.g., $C_2$ to $C_5$, monoolefins, said additional polymer having a number average molecular weight of at least about 900, and a molecular weight distribution of less than about 4.0, preferably less than about 3.0 (e.g., from 1.2 to 2.8). Preferably such additional olefin polymers comprise a major molar amount of $C_2$ to $C_{10}$, e.g., $C_2$ to $C_5$ monoolefin. Such olefins include ethylene, propylene, butylene, isobutylene, pentene, octene-1, styrene, etc. Exemplary of the additionally charged homopolymers are polypropylene, polyisobutylene, and poly-n-butene the like as well as interpolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene: or a copolymer of ethylene, propylene and 1,4-hexadiene; etc. The additional such olefin polymers charged to the alkylation reaction will usually have number average molecular weights of at least about 900, more generally within the range of about 1,200 and about 5,000, more usually between about 1,500 and about 4,000. Particularly useful such additional olefin alkylating agent polymers have number average molecular weights within the range of about 1,500 and about 3,000 with approximately one double bond per chain. An especially useful additional such polymer is polyisobutylene. Preferred are mixtures of such polyisobutylene with ethylene-propylene copolymers wherein at least 30 wt. % of the copolymer chains contain terminal ethenylene monounsaturation as described above.

The number average molecular weight for such polymers can be determined by several known techniques. A convenient method for such determination is by gel permeation chromatography (GPC) which additionally provides molecular weight distribution information; see W. W. Yau, J. J. Kirkland and D. D. Bly, "Modern Size Exclusion Liquid Chromatography", John Wiley and Sons, New York, 1979.

As previously mentioned, the immobilized catalysts and processes of the present invention offer a number of advantages over conventional carbocationic catalysts and polymerization processes.

A particularly significant advantage of the immobilized catalyst and process of the present invention is that the catalyst is usable for prolonged periods of time before regeneration is required resulting in significant cost savings, as well as the elimination of significant amounts of hazardous waste typically generated in conventional Lewis Acid processes.

Another surprising and unexpected advantage of the present invention is that the polymerization process can be operated, depending upon the desired molecular weight of the polymer, at relatively higher temperatures, even ambient temperatures.

Yet another surprising and unexpected advantage of the present invention is that gaseous catalysts such as $BF_3$ can now be immobilized.

Another advantage of the immobilized catalysts of the present invention is that the catalysts are easy to dispose of in an environmentally advantageous manner.

Yet still another advantage of the immobilized catalysts of the present invention is that the catalysts can be regenerated in situ, for example, by first using an acid wash followed by Lewis Acid reagent.

Another advantage of the immobilized Lewis Acid catalysts of the present invention is that they can be used in most organic solvents. The immobilized catalysts do not require that their use be limited to specific solvents, for example, halogenated solvents.

And yet another advantage of the immobilized Lewis Acid catalysts of the present invention is that the polymers produced using these catalysts have little or no catalyst residue.

Polybutenes and other polymers and copolymers in the molecular weight range of 500 to 20,000 prepared in accordance with the process of the present invention are particularly useful as a feedstock for the production of improved lubricating oil dispersants. These dispersants generally comprise the reaction product of polybutenyl ($\overline{M}n$ of 700 to 10,000) succinic anhydride, or the acid form thereof, with monoamines or polyamines having at least one primary or secondary amino group such as the alkylene polyamines, particularly the ethylene polyamines, the polyoxyalkylene amines, aromatic and cycloaliphatic amines, hydroxyamines, monoaliphatic and dialiphatic substituted amines. Useful dispersants are also formed by reacting monohydric and polyhydric alcohols with the polyisobutenyl succinic anhydride or diacid provided in accordance with this invention and preferred materials are thus derived from polyols having 2 to 6 OH groups containing up to about 20 carbon atoms such as the alkene polyols and alkylene glycols. Also suitable are the polyoxyalkylene alcohols such as polyoxyethylene alcohols and polyoxypropylene alcohols, monohydric and polyhydric phenols and naphthols, ether alcohols and amino alcohols and the like. Borated derivatives of the foregoing dispersants are also useful, especially borated nitrogen containing dispersants resulting from boration with boron oxide, boron halide, boron acids and esters to provide 0.2 to 2.0 weight percent boron in the dispersant. Metals and metal-containing compounds can also form useful dispersants and these are compounds capable of forming salts with the polybutenyl succinic anhydride or acid (using the polybutenes of the present invention) These include metals such as the alkali metals, alkaline-earth metals, zinc, cadmium, lead, cobalt, nickel, copper, molybdenum, in the form of oxides, carboxylates, halides, phosphates, sulfates, carbonates, hydroxides and the like.

Lubricating oil compositions will usually contain dispersants in amounts of from about 1 to 15 weight percent based on the overall weight of the composition. Lubricating oil compositions will typically contain other additives in customary amounts to provide their normal attendant functions such as metal detergents or basic metal detergents, antiwear additives, antioxidants, viscosity modifiers and the like. Dispersants are conventionally packaged and dispensed in the form of solution concentrates containing about 20 to 50 wt. % dispersant in a mineral oil.

The following examples are illustrative of the principles and practice of this invention, although not limited thereto. Parts and percentages where used are parts and percentages by weight. The structure of the catalysts where used in the examples are only meant to serve to identify the particular immobilized catalyst and do not represent the actual structure of the catalyst.

EXAMPLE 1

(a) Copolymerization of Propylene and Hexenyl-9-BBN

Into a 500 ml evacuated flask containing 200 ml of toluene, 4 ml of propylene (50 mmol) was introduced at a temperature of −78° C. The flask was sealed and gradually warmed to room temperature to dissolve the gas. In a dry box, 4 g (20 mmol) of hexenyl-9BBN were added followed by a suspension of 0.168 g (1.113 mmol) $TiCl_3AA$ ("AA" is alumina activated) and 0.754 g (6.604 mmol) $Al(Et)_3$ aged for ½ hour in 30 ml of toluene. Almost immediately, a precipitate could be seen in the deep purple suspension. The reaction was terminated after ½ hour by addition of isopropanol. A white, rubbery polymer was precipitated and then repeatedly washed with more isopropanol. The white rubbery polymer was squeeze dried and then further dried in a vacuum chamber to yield 3.5 g of borane-containing polypropylene.

(b) Synthesis of Poly(propylene-co-1-hexenyl-6-ol)

0.674 g of the borane-containing polypropylene copolymer of Part (a) was placed in 75 ml of THF in a 250 ml stirred roundbottom flask fitted with an airtight septum to form a cloudy white suspension. The stirred suspension was cooled to 0° C. in an ice bath before the addition via syringe of 2 molar equivalents (based on alkylborane content) of degassed NAOH solution followed by dropwise addition of 3 equivalents of 30% $H_2O_2$ solution. The flask was gradually warmed to 55° C. and held at that temperature for 4 hours. The functionalized copolymer was precipitated with water, washed with acetone, refluxed in MeOH (methanol), and again precipitated with water and washed with acetone.

EXAMPLE 2

(a) Preparation of Immobilized Catalysts

In a dry 200 ml flask, equipped with a magnetic stirring bar and a connecting tube leading to a nitrogen source, the functionalized copolymer (2 g) of Example 1 was suspended in 50 ml of $CH_2Cl_2$ with 180 mg of triethyl aluminum ($AlEt_3$) for 2 hours at ambient temperature. The composition of the copolymer included 98 mole % of propylene and 2 mole % of hexenol. The melting point of this polymer was about 165° C. The solid particles were separated from solution by syringing out the liquid portion and then were washed with dry and oxygen-free $CH_2Cl_2$ several times. The resulting immobilized catalyst (PP-0-$AlEt_2$) was dried for 24 hours, at room temperature and 10 μm Hg pressure, before transferring into a dry box. For convenience, the following short hand designation of PP-0-$AlEt_2$ is used with PP being the unfunctionalized polymeric units, i.e. polypropylene, and -0-$AlEt_2$ indicating the immobilized catalyst structure, i.e. -1-hexenyl-6-0-diethyl aluminum.

(b) Polymerization of Isobutylene

Figure 7:
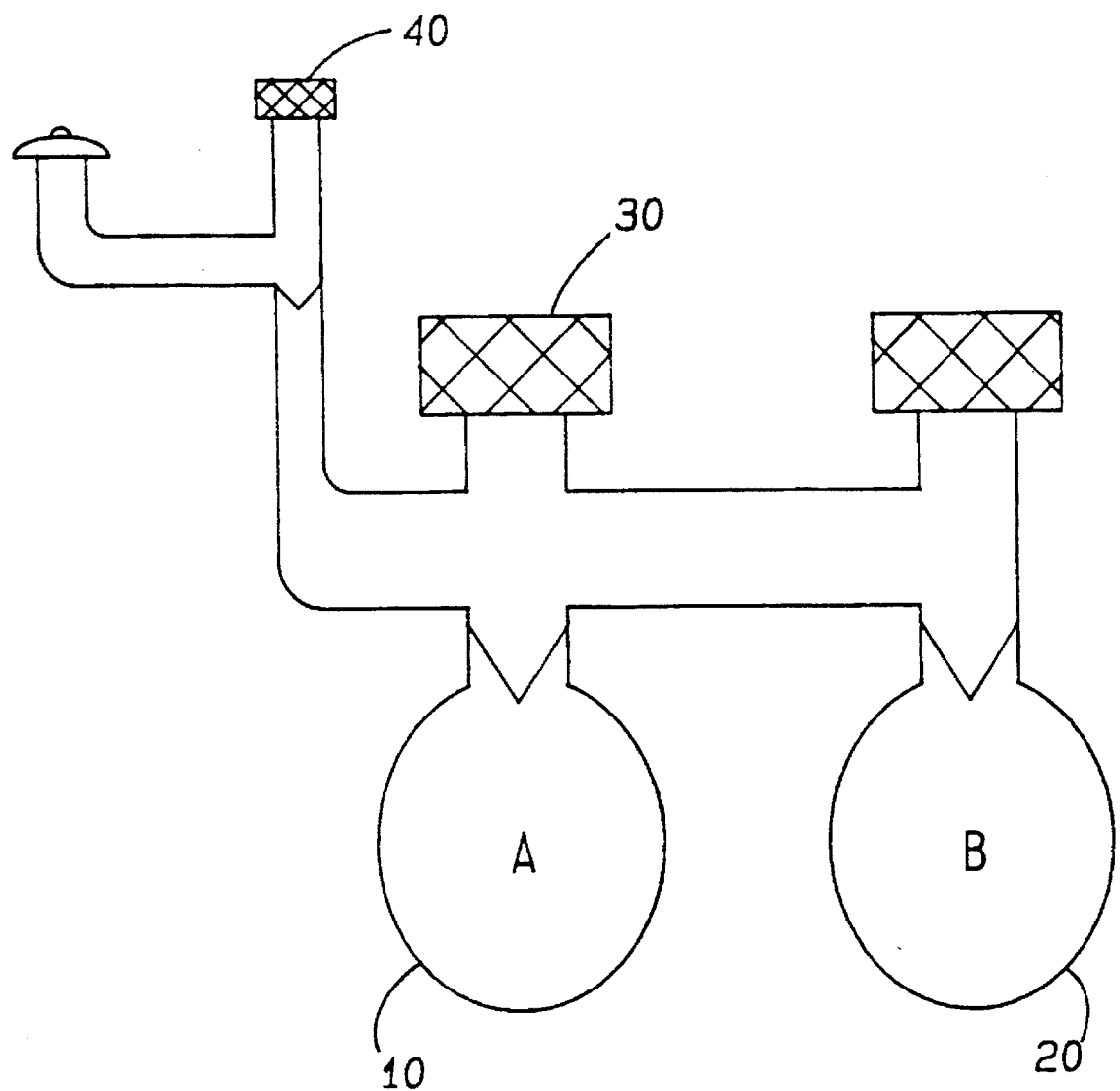
FIG. 7: Is a schematic diagram of the experimental apparatus of Examples 54–57.

A polymerization was carried out in a high vacuum apparatus consisting of two 200 ml flasks equipped with magnetic stirrers (FIG. 7). One stopcock 30 was used to separate two flasks (A and B), the other stopcock 40 located on the top of flask A was used to control the vacuum condition and inert gas flow. After the apparatus was dried for over 12 hours, a portion of the immobilized catalyst PP-0$AlEt_2$ (0.2 g) of part (a) was charged to flask B in a dry box condition. The system was connected to a vacuum line and pumped to high vacuum, and then 50 ml dry $CH_2Cl_2$ and 2 ml (1.2 g) dry isobutene were vacuum-distilled into flask A by immersing the flask in a dry ice/acetone bath. The catalyst to monomer molar ratio was 1/200. After controlling both flasks at 0° C., the monomer solution in flask A was poured into flask B. The polymerization occurred at 0° C. with stirring. After a half hour reaction time, the catalyst was allowed to settle. The solution portion, polyisobutylene, $CH_2Cl_2$ and unreacted isobutene, was then carefully poured back into flask A without disturbing the precipitate (immobilized catalyst). The precipitate was further washed by low temperature distillation of pure $CH_2Cl_2$ from flask A. This procedure was repeated several times to ensure complete removal of polyisobutylene from the surface of the immobilized catalyst. The product was then decanted from flask A. Evaporation under vacuum gave 1.2 g (100% yield) of viscous polymer. A GPC study of resulting polymer showed a relatively high molecular weight ($\overline{M}n$=24,516 and $\overline{M}w$=160,062).

A repeat polymerization using the recovered catalyst and the same reaction condition gave about 1.05 g (87% yield) polyisobutylene. The polymer had slightly lower average molecular weight ($\overline{M}n$ 14,325 and $\overline{M}w$=120,111). A third cycle polymerization resulted in polymer with about 70% yield and similar number average molecular weight, weight average molecular weight and molecular weight distribution.

EXAMPLE 3

The immobilized catalyst of Example 2 (a) was used to polymerize isobutene in hexane solvent. The polymerization was carried out using the reaction procedure of Example 2 (b), using 0.2 g of PP-0-$AlEt_2$ and 1.2 g of isobutene in 50 ml of dry hexane. The polymerization temperature was at 00C. The product was a water white, very viscous polymer with almost 100% yield and moderate molecular weight ($\overline{M}n$ 5,667 and=22,496). This immobilized catalyst was reused for a $\overline{M}w$ second batch polymerization to generate an 80% yield with a reproducible molecular weight ($\overline{M}n$ 6,330 and $\overline{M}w$=21,898).

EXAMPLE 4

Following the procedure of Example 2 (a), hydroxy functionalized polypropylene copolymer (i.e. poly(propylene-co-1-liexenyl-6-ol)) was reacted with excess $AlCl_3$ in $CH_2Cl_2$ solution. Due to the limited solubility of $AlCl_3$, the contact time was about 24 hours at room temperature. This reaction evolved HCl and produced PP-0-$AlCl_2$ catalyst which was then washed free of unreacted $AlCl_3$ and HCl before drying under vacuum overnight, where PP-0-$AlCl_2$ is analogous to the short hand as described in Example 2(a).

This catalyst was used in the polymerization of isobutene using the procedure of Example 2(b). The solvent was $CH_2Cl_2$ and the reaction temperature was 30° C. Within one half hour polymerization time, almost 100% yield of polyisobutylene was obtained with a very broad molecular weight distribution ($\overline{M}n$ 15,334 and=369,495). The second cycle was operated at 0° C. The yield was reduced to 55% with a similar broad molecular weight distribution and a relatively lower molecular weight ($\overline{M}n$=4,657 and $\overline{M}w$=130,843).

EXAMPLE 5

Hydroxy group functionalized polypropylene copolymer (poly(propylene-co-1-hexenyl-6-ol)) (0.2 g) suspended in 100 ml of $CH_2Cl_2$ solution was contacted with $BF_3$ by condensing $BF_3$ (excess) into the solution. The reaction mixture was stirred for 6 hours before pumping out the unreacted $BF_3$, HF and $CH_2Cl_2$ solvent. Under high vacuum (<5 um) for overnight, the catalyst was contacted with monomer solution (1. 2 g of isobutene in 50 ml of hexane) using the technique of Example 2 (b) A viscous polymer was obtained with an overall yield of about 75%.

EXAMPLE 6–15

Cationic polymerizations were carried out in accordance with the procedure of Example 2(b) ; however, the immobilized catalyst used was PP-0-AlEtCl. This was derived from the Lewis Acid aluminum ethyl dichloride ($AlEtCl_2$). PDI is the polydispersity index which is $\overline{M}w/\overline{M}n$. This is the same as molecular weight distribution. A narrow molecular weight distribution, i.e. , low PDI, is desirable for use of the polymer as a dispersion agent. The results are presented in the following table.

TABLE 1

| | Solvent | Temp (°C.) | Time (Hr) | $\overline{M}n$ | PDI | Yield (%) |
|---|---|---|---|---|---|---|
| Ex. 6 | hexane | −10 | 2 | 9,500 | 2.7 | 35 |
| Ex. 7 | hexane | −10 | 4 | 10,200 | 3.1 | 55 |
| Ex. 8 | hexane | 0 | 4 | 4,050 | 3.9 | 65 |
| Ex. 9 | hexane | 0 | 6 | 4,700 | 3.2 | 80 |
| Ex. 10 | hexane | 25 | 4 | 2,100 | 3.7 | 70 |
| Ex. 11 | hexane | 25 | 6 | 1,750 | 3.8 | 90 |
| Ex. 12 | hexane | 25 | 8 | 1,850 | 3.6 | 100 |
| Ex. 13 | $CH_2Cl_2$ | 0 | 2 | 15,300 | 3.4 | 65 |
| Ex. 14 | $CH_2Cl_2$ | 0 | 4 | 14,700 | 3.1 | 85 |
| Ex. 15 | $CH_2Cl_2$ | 0 | 6 | 13,500 | 2.8 | 95 |

EXAMPLES 16–21

(a) Preparation of Supported Catalysts PB-O-$AlCL_2$

In the following Examples, the supporting material was hydroxy functionalized polybutene-1 copolymer (poly-(butene-1-co-1-hexenyl-6-ol)) which contained 10 mole % of 1-hexenyl-6-ol (hydroxyl groups). The polymer was ground to a fine powder form having high surface area by freezing with liquid nitrogen and then pulverizing by placing in a sealed metal container with a metal ball and shaking the container and its contents for a sufficient length of time to pulverize the immobilized catalyst such that the average particle size was about 0.1 mm and the particles ranged in size from about 0.01 mm to about 0.5 mm. In a dry 200 ml flask, the hydroxyl functionalized polybutene copolymer (0.2 g) was suspended in 50 ml of toluene solution with 10 mole % excess ethyl aluminum dichloride ($EtAlCl_2$) for 5 hours at 25° C. The powders were separated from solution by filtration through glass fret, and then were washed with dry and oxygen-free toluene for several times. After drying, the resulting immobilized catalyst (PB-O-$AlCl_2$) was subjected to the structural characterization. Elementary analysis and $^{23}$Al NMR confirmed the complete conversion of -OH to -$OAlCl_2$ groups.

(b) Polymerization of Isobutylene

A polymerization of isobutylene by PB-0-$AlCl_2$ was carried out in a high vacuum apparatus as described in Example 2. PB-O-$AlCl_2$ (50 mg) was charged to flask B in a dry box condition. The system was connected to a vacuum line and pumped to high vacuum, 50 ml dry hexane and 4 ml (2.4 g) dry isobutylene were vacuum-distilled into flask A by immersing the flask in a dry ice/aceton bath. The monomer solution in flask A was warmed up to room temperature before pouring into flask B. The polymerization occurred at ambient temperature with stirring. After 20 minutes reaction time, the catalyst was allowed to settle. The solution portion, polyisobutylene/hexane, was then carefully pipetted our from flask B without disturbing the precipitate (immobilized catalyst). After solvent-evaporation under vacuum, a viscous polyisobutylene polymer was obtained. This procedure was repeated for several times to evaluate the polymerization reactivity in the subsequent cycles. The results are summarized in the following Table 2.

TABLE 2

| | Reaction Time (Min.) | Yield | Temp. (°C.) | $\overline{M}n$ | PDI |
|---|---|---|---|---|---|
| Ex. 16 | 20 | 100% | 25 | 1067 | 2.02 |
| Ex. 17 | 20 | 100% | 25 | 1157 | 1.61 |
| Ex. 18 | 20 | 100% | 25 | 1135 | 1.75 |
| Ex. 19 | 10 | 100% | 25 | 1120 | 1.68 |
| Ex. 20 | 40 | 100% | 0 | 4228 | 2.37 |
| Ex. 21 | 30 | 100% | 0 | 4526 | 2.34 |

PDI = Polydispersity Index = Mw/Mn

EXAMPLES 22–31

Polymerization Of Isobutylene by Immobilized catalysts PB-O-$AlCl_2$

As in Exanples 16–21, the same functionalized polybutene-1 copolymer with 10 mole % of 1-hexenyl-6-ol (hydroxyl groups) was used in the preparation of polyisobutylene. The major difference was the form of functionalized polymer. A piece of hydroxylated polybutene solid (0.1 g) was reacted with $EtAlC_2$ overnight at 25° C. The reaction was complete despite the inhomogeneity of reaction conditions. Elementary analysis showed the Ratio of Al:O:Cl equal to 1:1:2. This indicated that the reaction was occurring at the ethyl site. The polymerization of isobutylene by PB-O-$AlCl_2$ particles was carried out in a high vacuum apparatus as described before. In each reaction cycle, 4 ml (2.4 9) of dry isobutylene were used. The results are summarized in Table 3, with RT at about 25° C.

TABLE 3

| | Catalyst | Solvent | Temp | Time (hr) | Yield (%) | $\bar{M}n$ | PDI |
|---|---|---|---|---|---|---|---|
| Ex. 22 | PB—O—AlCl$_2$ | Hexane | RT | 2 | 100 | 1,375 | 3.03 |
| Ex. 23 | PB—O—AlCl$_2$ | Hexane | RT | 20 | 100 | 1,964 | 2.59 |
| Ex. 24 | PB—O—AlCl$_2$ | Hexane | RT | 20 | 100 | 1,316 | 2.41 |
| Ex. 25 | PB—O—AlCl$_2$ | Hexane | RT | 5 | 100 | 1,014 | 2.15 |
| Ex. 26 | PB—O—AlCl$_2$ | Hexane | RT | 3 | 90 | 1,398 | 2.38 |
| Ex. 27 | PB—O—AlCl$_2$ | Hexane | RT | 1 | 45 | 1,237 | 2.36 |
| Ex. 28 | PB—O—AlCl$_2$ | Hexane | RT | 5 | 100 | 1,125 | 2.41 |
| Ex. 29 | PB—O—AlCl$_2$ | Hexane | 0° C. | 6 | 70 | 5,454 | 2.63 |
| Ex. 30 | PB—O—AlCl$_2$ | CH$_2$Cl$_2$ | −30° C. | 1 | 100 | 180,976 | 4.12 |
| Ex. 31 | PB—O—AlCl$_2$ | CH$_2$Cl$_2$ | 0° C. | 1 | 95 | 100,253 | 8.6 |

EXAMPLES 32–34

Polymerization of Isobutylene

A piece of hydroxylated polybutene-1 copolymer solid (0.1 g) as in Examples 16–21 (i.e. poly(butene-1-col-hexenyl-6-ol)) was reacted with BF$_3$ which was condensed in CH$_2$Cl$_2$ solution. The reaction took place for 2 hours at 25° C. before distillating out excess BF$_3$ and CH$_2$Cl$_2$ The resulting immobilized catalyst was used in the polymerization of isobutylene. Similar reaction procedures were followed in the evaluation of the immobilized catalyst. The results are summarized in the following Table 4. The reaction of the BF$_3$ with the hydroxylated polybutene-1 copolymer resulted in the formation of a complex wherein the BF$_3$ is complexed with the hydroxyl groups in the copolymer via a pi ($\pi$) bond.

TABLE 4

| | Catalyst | Solvent | Temp | Time (hr) | Yield (%) | $\bar{M}n$ | PDI |
|---|---|---|---|---|---|---|---|
| Ex. 32 | PB—OH—BF$_3$ | Hexane | RT | 5 | 95 | 400 | 1.1 |
| Ex. 33 | PB—OH—BF$_3$ | Hexane | RT | 12 | 98 | 445 | 1.2 |
| Ex. 34 | PB—OH—BF$_3$ | Hexane | 0° C. | 4 | 95 | 576 | 1.2 |
| Ex. 35 | PB—OH—BF$_3$ | Hexane | −15° C. | 4 | 50 | 662 | 1.72 |

EXAMPLES 36–46

Polymerization of Isobutylene by a Mixture of PB-O-AlEtCl and (PB-O)$_2$-AlCl

A piece of the hydroxylated polybutene-1 copolymer solid (0.1 g) of Examples 17–22 was reacted with Et$_2$AlCl overnight at 25° C. The reaction was complete, resulting in a mixture of PB-O-AlEtCl and (PB-0)$_2$-AlCl. This mixed, solid particle, immobilized catalyst was used in the polymerization of isobutylene. The reaction conditions of Examples 16–21 were used to evaluate the reactivity of the immobilized catalyst. The reaction time was about 5 hours. The results are summarized in the following Table 5.

TABLE 5

| | Solvent | Temp. (°C.) | Mn | Mw | Yield (%.) |
|---|---|---|---|---|---|
| Ex. 36 | Hexane | −10 | 9,525 | 25,254 | 100 |
| Ex. 37 | Hexane | 0 | 4,037 | 16,267 | 95 |
| Ex. 38 | Hexane | 0 | 4,705 | 15,454 | 90 |
| Ex. 39 | Hexane | 25 | 2,103 | 7,803 | 95 |
| Ex. 40 | Hexane | 25 | 2,038 | 7,408 | 82 |
| Ex. 41 | Hexane | 25 | 1,740 | 6,540 | 100 |
| Ex. 42 | Hexane | 25 | 1,844 | 6,763 | 100 |
| Ex. 43 | CH$_2$Cl$_2$ | 0 | 24,516 | 90,064 | 100 |
| Ex. 44 | CH$_2$Cl$_2$ | 0 | 12,575 | 100,235 | >80 |

TABLE 5-continued

| | Solvent | Temp. (°C.) | Mn | Mw | Yield (%.) |
|---|---|---|---|---|---|
| Ex. 45 | CH$_2$Cl$_2$ | −30 | 45,334 | 180,976 | 100 |
| Ex. 46 | CH$_2$Cl$_2$ | 0 | 8,945 | 100,253 | 95 |

EXAMPLE 47

The immobilized catalyst of Examples 6–15 is used to make a coating composition. The coating composition is made by mixing 5 wt. % parts of the catalyst with 95 wt. % trichlorobenzene in a conventional mixing vessel at room temperature for a sufficient amount of time to completely dissolve the immobilized catalyst.

The composition is coated onto the interior surface of a 316-stainless steel reactor vessel. The coating is applied using a conventional spraying apparatus. After application, the coating is dried by heating at 150° C. under vacuum until dry. The coating is uniform and has an average thickness of about 0.1 mm. The coated reactor may be used in a polymerization process to polymerize monomer feeds.

EXAMPLE 48

The immobilized catalyst of Examples 6–15 is fed to a conventional injection molding apparatus having a feed means, heating means, cooling means, extruding means and molds. The catalyst is heated under sufficient heat and pressure to a temperature of at least about 185° C., injected into the mold and molded under sufficient heat and pressure, and for a sufficient time, to form an object having the shape of a column packing ring. The object is then cooled and removed from the mold. The object may be used in a packed column reactor vessel to polymerize monomer feeds.

EXAMPLE 49

The immobilized catalyst of Examples 6–15 is placed into a conventional vessel having a heating jacket and heated to a temperature of about 200° C. for a sufficient amount of time time to liquify the immobilized catalyst. Ceramic spheres having a diameter of about 1 mm are dipped into the liquid immobilized catalyst and removed. The spheres have a liquid coating of the immobilized catalyst which solidifies upon cooling. The coated spheres are used as catalyst in a batch reactor in a polymerization process.

EXAMPLE 50

The immobilized $BF_3$ of Examples 33–36 is charged to a conventional stirred tank reactor having heating and cooling means and agitating means. An excess molar ratio of an aromatic hydrocarbon (benzene) is charged to the reactor. A polyalkene (poly-n-butene (PNB)) is fed to the reactor. The PNB reacts with the benzene under suitable reaction conditions at a sufficient temperature (40° C.) and pressure, and for a sufficient time, effective to alkylate the aromatic hydrocarbon. The resulting product PNB alkylated benzene, is then discharged from the reactor and separated from unreacted benzene by distillation.

EXAMPLE 51

The process of Example 50 is repeated except that the immobilized catalyst is the immobilized catalyst of Example 22–31. The aromatic hydrocarbon is benzene and the alkylating olefin is propylene oligomer with an average molecular weight of about 340. The reaction temperature is about 30° C. and the reactor is a continuous stirred tank reactor.

EXAMPLE 52

A continuous tubular reactor is packed with the immobilized catalyst of Examples 16–21. Isobutane is fed into the reactor in a feedstream and, simultaneously, isobutylene from a refinery feedstream is fed into the reactor. A cocatalyst, HCl, is also fed into the reactor. The mixture is held in the reactor for a sufficient length of time and under sufficient temperature and pressure to alkylate the butane to a degree of about 50%. Branched octane (alkylated butane) and the unreacted monomers are withdrawn in a discharge stream. The branched octane is separated from the unreacted monomers by distillation.

EXAMPLE 53

The functionalized copolymer of Examples 16–21 is reacted with n-butyl lithium to form an intermediate salt in the following manner. To a conventional reactor vessel having a mixing means, is charged hexane and the functionalized copolymer of Example 1. The functionalized copolymer is dispersed in the hexane by mixing. Then, an excess (1.1–5 times molar ratio) of n-butyl lithium hexane solution (1.5 m) is added to the vessel. The reaction is held at room temperature (about 25° C.) for two hours. Then, the resulting intermediate (functionalized copolymer salt) is removed by filtration and washing with pure hexane. The resulting intermediate is then reacted with BF3 utilizing the procedure of Examples 32–35 to form a catalyst having a structure identified as $PB-O-BF_2$ wherein the $BF_3$ is chemically reacted with, and chemically bonded to, the functionalized thermoplastic copolymer. Similar reaction conditions are followed in the evaluation of the catalyst using isobutylene monomer as a feed. The resulting polymers are observed to have an Mn in the range of about 1,000 to about 1,500.

EXAMPLES 54–57

Functionalization chemistry, as recited in Chung, T. C.; *Macromolecules*, 1988, 21, 865, Ramakrishnan, S.; Berluche, E.; Chung, T. C.; *Macromolecules*, 1990, 23, 378, Chung, T. C.; Rhubright, D., *Macromolecules*, 1991, 24, 970, using a borane monomer as the comonomer in the polymerization of polyolefins by Ziegler-Natta catalyst, was used to prepare a polyolefin structure. Isotactic polypropylene, as recited in Chung, T. C.; Rhubright, D., *Macromolecules*, 1991, 24, 970, with 5 mole % of hydroxy groups and isotactic polybutene (PB-OH) with 12 mole % of hydroxy groups, were used as the substrates to immobilize Lewis acids which are active in the carbocationic polymerization of isobutylene. Both functionalized polyolefins have "brushlike" microstructures, as recited in Chung, T. C., *Chem. Tech.* 27, 496, 1991.

FIG. 1 shows the PP-OH product having crystalline phase and functional groups selected from—OH, —I, $AlX_2$ and $BX_2$ wherein X is a halide or alkylhalide.

Several experiments were introduced in which the hydroxylated polyolefins, polypropylene or polybutene, were reacted with Lewis acids, such as $EtAlCl_2$, $Et_2AlCl$ and $BF_3$ according to the following equation:

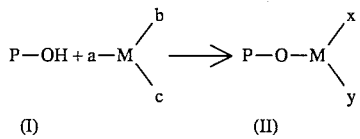

P is the partially crystalline polyolefins which have 5 or 12 mole % of hydroxy groups. M is B or Al atom, the ligands (a, b, c) can be either alkyl or halogen groups and x, y can be a, b, c or oxygen. The hydroxy groups react with either alkyl group or halogen. Additionally, two hydroxy groups can react with one M. The reaction was usually carried out at room temperature by stirring the hydroxylated polymer with excess Lewis acid solution for a few hours. The unreacted reagent was removed by washing the resulting immobilized catalyst with pure solvent for several times. In general, the alkyl groups have been found to be more reactive to hydroxy group than halides. To enhance the reactivity in $BF_3$ case, the hydroxy groups in polymer were usually metalated, such as by the reaction with alkyl lithium, before immobilization reaction.

Figure 4:
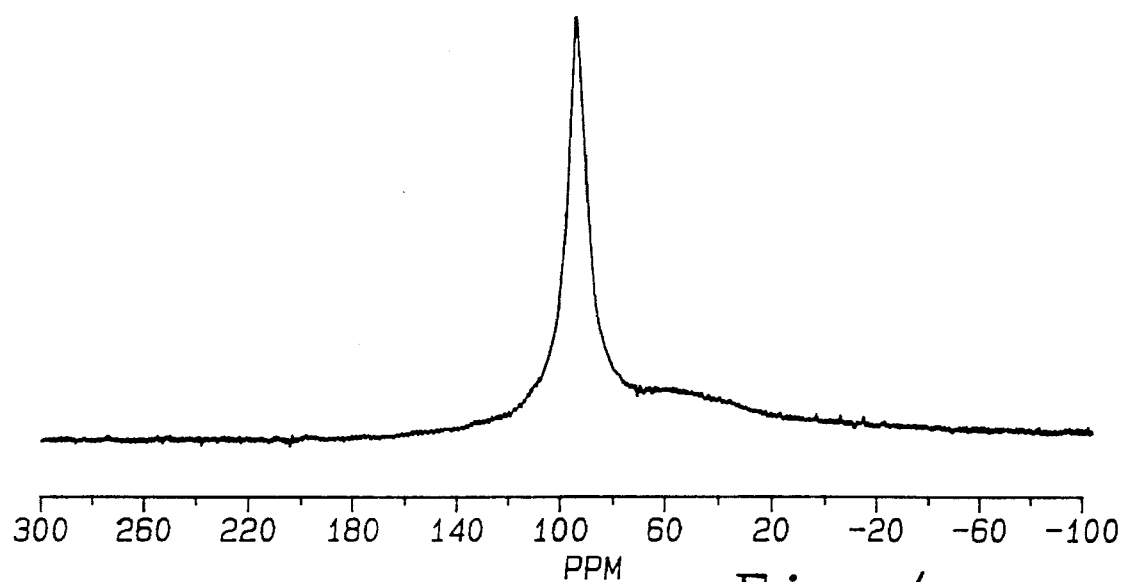
FIG. 4: $^{27}$Al spectrum of an unmobilized catalyst derived from hydroxylated polypropylene and aluminum ethyl dichloride (Example 54).

Solid state $^{27}Al$ and $^{11}B$ NMR measurements were used to analyze the catalytic species in the immobilized catalyst. Three immobilized catalysts were studied in detail, by comparing the immobilized catalysts with their corresponding soluble ones. FIG. 4 shows the $^{27}Al$ spectrum of the catalyst (A), prepared by reacting hydroxylated polypropylene with $EtAlCl_2$ at room temperature. Only a singlet peak at 89 ppm, corresponding to $-OAlCl_2$ with four coordinations, as recited in Benn, R.; Rufinska, A., Angew. Chem. Int. Ed. Engl., 1986, 25, 861, was observed with the absence of 170 ppm, corresponding to $EtAlCl_2$. It was surprising to find such a selective reaction, the alkyl-aluminum bond is much more reactive than aluminum-halide bond in the reaction with alcohol.

Figure 4A:
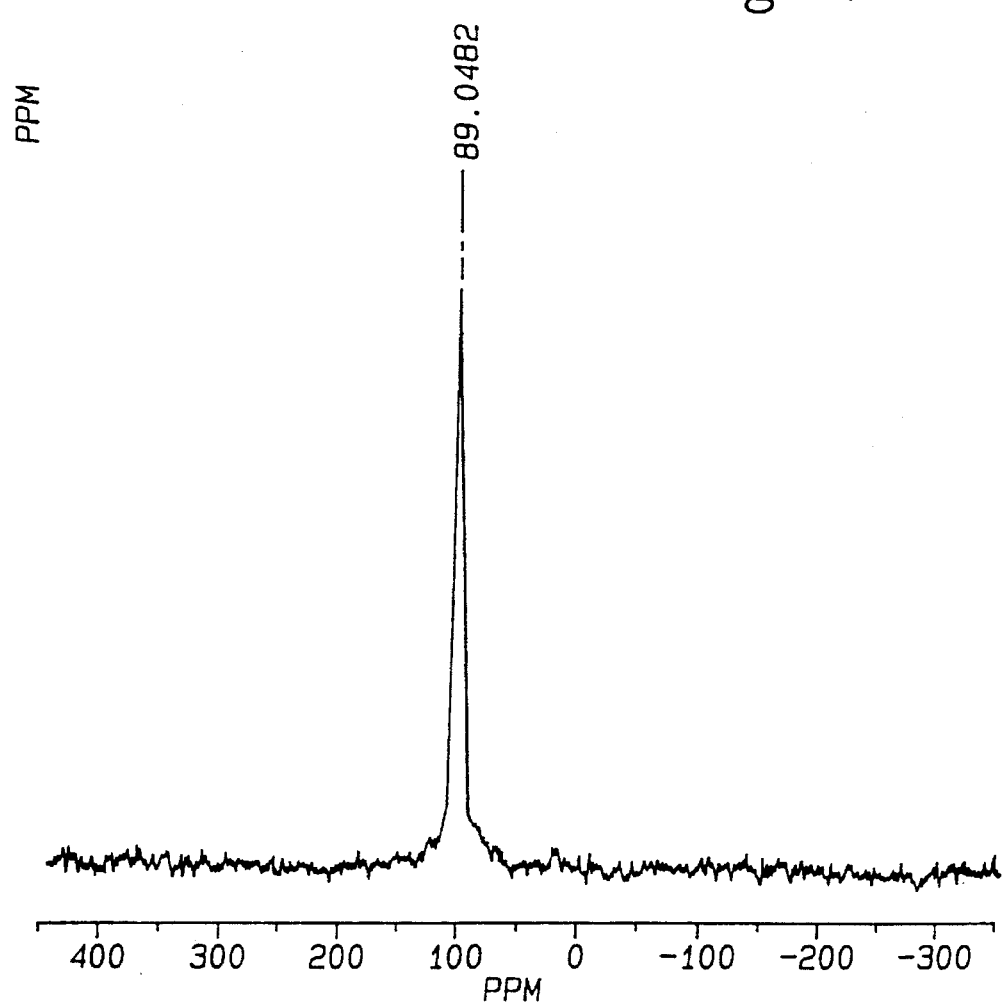
FIG. 4A is a comparative spectrum of the reaction product of 1-pentanol and aluminum ethyl dichloride.

The same chemical reaction was also observed in the reference sample, using 1-pentanol, instead of the hydroxylated polypropylene, in the reaction of $EtAlCl_2$ under the similar reaction condition. FIG. 4A is the solution $^{27}Al$ NMR spectrum of resulting $C_5$-OAC $_2$, which indicates the same chemical shift, corresponding to single $-OAlCl_2$ species. The elemental analysis study, with the same theoretical and experimental mole ratio of elements in $C_5$-OAlCl_2$ compound, also reconfirms the result.

The immobilization reaction was substantially complete in relatively mild reaction condition. Most of hydroxy groups disappeared despite the shape and size of hydroxylated polymer particles. The elemental analysis results show that the concentration of Al species in the immobilized catalyst was very close to that of hydroxy group in the original functionalized polyolefin. The complete reaction in this heterogeneous system supports the morphologic arrangement in FIG. 1, most of hydroxy groups are located in the amorphous phase which can be easily reached by $EtAlCl_2$ reagent.

Figure 5:
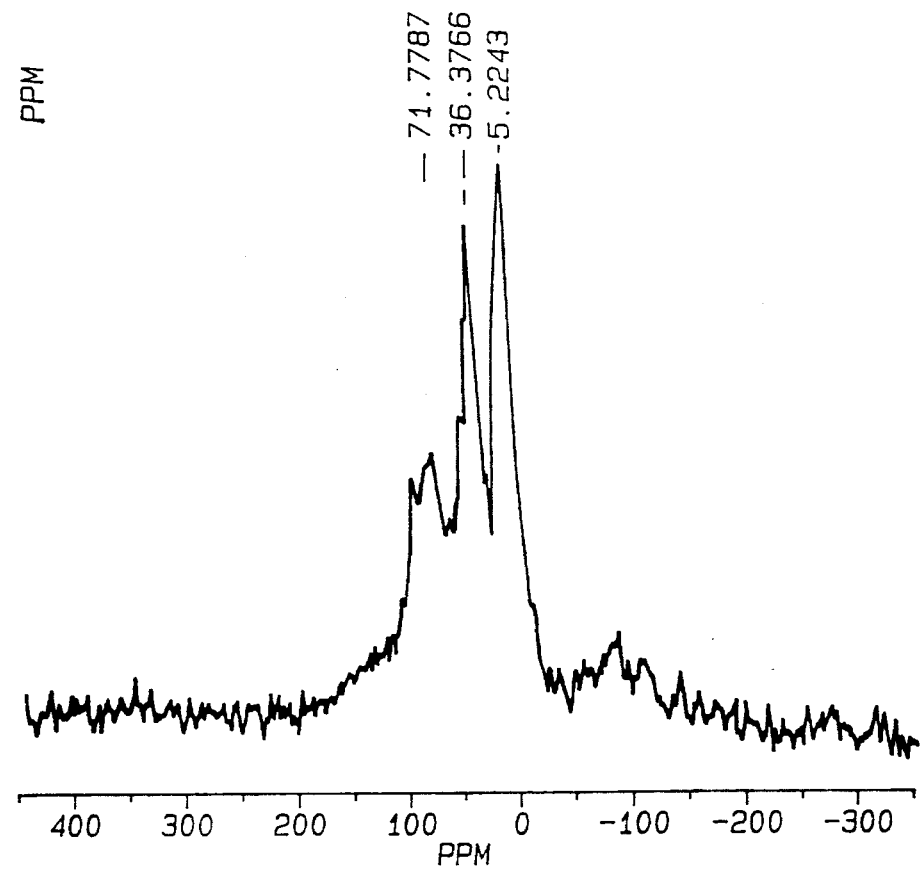
FIG. 5: $^{27}$Al NMR spectrum of an unmobilized catalyst derived from hydroxylated polybutene and aluminum diethyl chloride (Example 54).
Figure 5A:
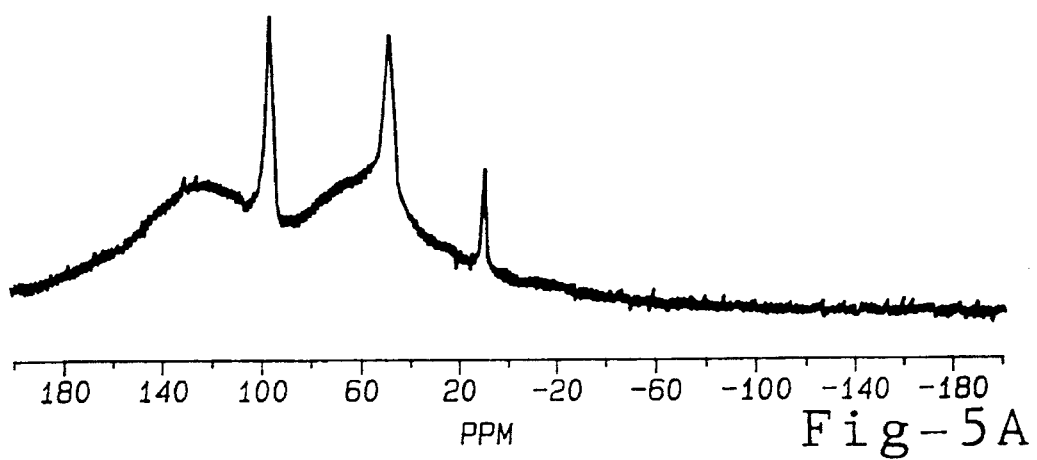
FIG. 5A is a comparative spectrum of the reaction product of 1-pentanol and aluminum ethyl dichloride.

In the case of $Et_2AlCl$, there are two alkyl groups which are very reactive to hydroxy group. Using excess $Et_2AlCl$ reagent to the hydroxy groups (12%) in PB-OH, it was expected that the resulting immobilized catalyst (B) would be a mixture. FIG. 5 compares the solid state $^{27}Al$ NMR spectrum of the immobilized catalyst (B) to the solution $^{27}Al$ NMR spectrum of the corresponding small molecule by reacting 1-pentanol with the stoichemetric amount of $Et_2AlCl$ (FIG. 5A). Both show similar results with three main peaks at about 93, 37, 4 ppm, corresponding to -OAlEtAl (four coordinations), -O)$_2$AlEt (five coordinations) and -O)$_2$AlCl (six coordinations) respectively, as recited in Benn, R.; Rufinska, A., Angew. Chem. Int. Ed. Engl., 1986, 25, 861, and no peak at 170 ppm, corresponding to $Et_2AlCl$.

The relative peak intensity between three Al peaks was also very similar in both spectra. The same degree of the reaction to form various species seems to indicate that the availability of hydroxy groups in polybutene solid is very close to that of soluble 1-pentanol case. This result is also consistent to the morphologic structure of "Brush-like" hydroxylated polybutene (FIG. 1).

Figure 6:
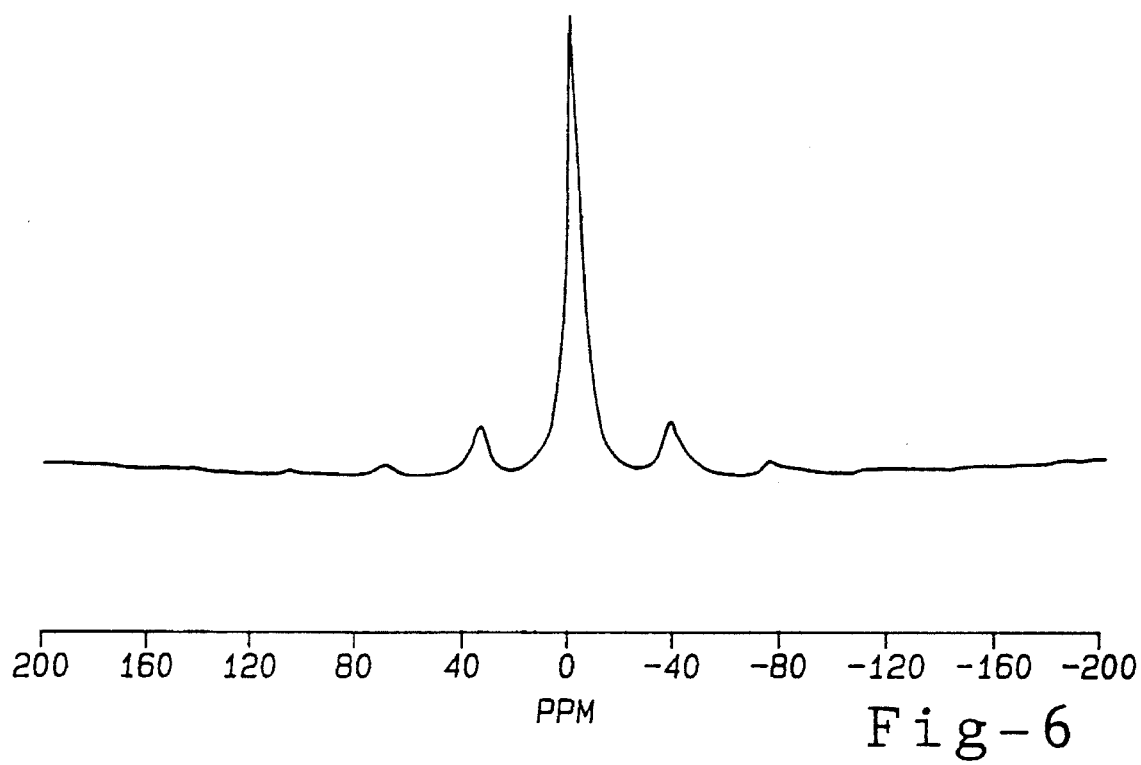
FIG. 6: $^{27}$Al NMR spectrum of an unmobilized catalyst derived from hydroxylated polybutene and BF$_3$ (Example 59).
Figure 6A:
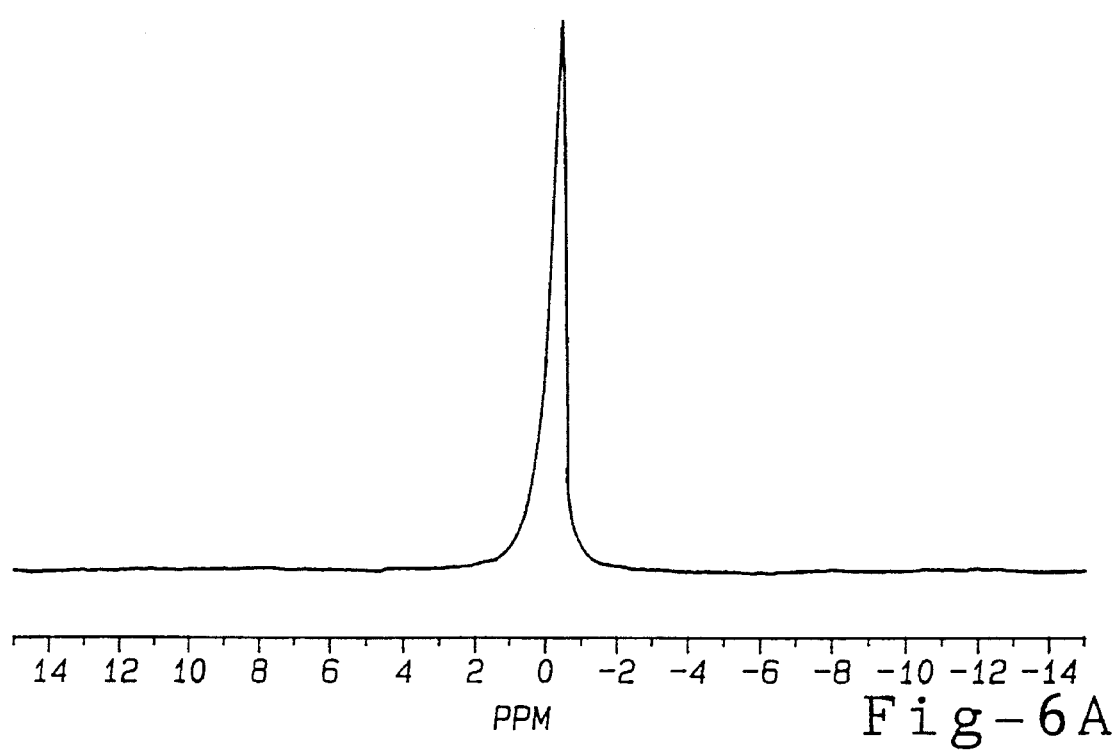
FIG. 6A is a comparative spectrum of the reaction product of 1-pentanol and aluminum ethyl dichloride.

Catalyst (C) is an immobilized $BF_3$ catalyst. The reaction between $BF_3$ and hydroxylated polymers (PB-OH) was conducted in two ways. The direct reaction between $BF_3$ and hydroxy group is very slow, and possibly forms the $BF_3$/OH complexes. The more effective immobilization reaction was carried out by using alkoxide groups. The metallization reaction of hydroxy groups was done by simple mixing of the polymer particles with butyl lithium solution. After washing out the excess butyl lithium, the polymer particles were subjected to $BF_3/CH_2Cl_2$ solution. The similar procedure was done in the control experiment, using 1-pentanol small molecule. FIGS. 6 and 6A compares their $^{11}B$ NMR spectra. Both spectra are almost identical with a peak at about 0 ppm, corresponding to -OBF$_2$ group, as recited in Noth, H.; Wrackmeyer, B.; *Nuclear Magnetic Resonance Spectroscopy of Boron Compounds;* Springer-Verlag, 1978. This result was also reconfirmed by elemental analysis study, it shows the mole ratio of 1:2 between B and F elements in PB-OBF$_2$ sample.

Materials and Measurements

In Examples 54–57 the following chemicals, 9-borobicyclononane (9-BBN), Al(Et)$_3$, AlEtCl$_2$, Al(Et)$_2$Cl and $BF_3$ (Aldrich), and TiCl$_3$AA (Stauffer), were used as received. HPLC grade toluene and THF were distilled from sodium anthracide. Isopropanol and 1,5-hexadiene were dried with $CaH_2$ and distilled under $N_2$. Propylene (Matheson) was passed through $P_2O_5$ and NaOH columns before drying with Al(Et)$_3$ at low temperature. Isobutylene (Matheson) was used without further purification. All the manipulations were carried out in an innert atmosphere glove box or on a Sclenck line.

The molecular weight of polyisobutylene was determined using Waters GPC. The columns used were of Phenomenex Phenogel of $10^4$, $10^3$, 500 and 100 A. A flow rate of 0.7 ml/min was used and the mobile phase was THF. Narrow molecular weight polystyrene samples were used as standards. All of the solution NMR's were done on Bruker AM 300 machine. In $^{27}Al$ NMR studies, toluene was used as solvent with deuterated toluene as lock solvent. For $^1H$ NMR studies, deuterated chloroform was used as solvent. MAS $^{27}Al$ NMR were conducted at CSU NMR Center on a Bruker AM 600 NMR spectrometer ($^{27}Al$ resonance frequency of 156.4 MHz and 14.5 KHz MAS speed). MAS lib NMR were conducted on Chemagnetics CMX 300 NMR spectrometer ($^{11}B$ resonance frequency of 95.4 MHz and 4 KHz MAS speed).

Preparation of Hydroxylated Polyolefins

In a typical case, 1.9 ml of propylene at approximately 78° C. (0.0293 moles) was transferred into a 500 ml evacuated flask containing 150 ml of toluene. The flask was sealed and gradually warmed to room temperature to dissolve the gas. In a dry box; 11.987 g (0.0587 mole) of hexenyl 9-BBN were added followed by a suspension of 0.168 g ($1.113 \times 10^{-3}$) TiCl$_3$AA and 0.754 g ($6.604 \times 10^{-3}$ mole) Al(Et)$_3$ aged for ½ hour in 30 ml of toluene. Almost immediately precipitate could be seen in the deep purple suspension. The reaction was terminated after ½ hour by addition of isopropanol. The polymer was precipitated and then repeatedly washed with more isopropanol. Borane containing polypropylene (0.674 g) was placed in 75 ml of THF in a 250 ml roundbottom fitted with an air-tight septum to form a cloudy white suspension. The stirring suspension was cooled to 0° C. in ice bath before the addition via syringe of 2 molar equivalents (based on alkylborane content) of degrassed NaOH solution followed by dropwise addition of 3 equivalents of 30% $H_2O_2$ solution. The flask was gradually warmed to 55° C. and held at that temperature for 4 hours. The polymer was precipitated with water, washed with acetone, refluxed in MeOH, and precipitated with water and again washed with acetone.

Immobilization of Aluminum Compounds ($EtAlCl_2$ and $Et_2AlCl$)

Two hydroxylated polymers, polypropylene containing 5 mole % hydroxy groups and polybutene containing 12 mole % hydroxy groups were used in the preparation of immobilized catalysts. Both polymers were slightly swellable in toluene. The reactions with the aluminum reagents were carried out at room temperature under the inert atmosphere. Both fine powder and big chunk polyolefin particles were treated in the same way. In a typical example, the hydroxylated polyolefin (150 mg) polymer, suspended in toluene (15 ml), was mixed with excess aluminum compounds (approximately 10 mmole). After a reaction time for 3 hours, polyolefin was filtered and washed with hexane repeatedly to remove remaining aluminum compounds. Based on the elemental analysis and $^{27}Al$ NMR studies, most of hydroxy groups were reacted without any unreacted aluminum compound in the polymer.

Synthesis of $C_5$-O-AlCl$_2$

In a control reaction, pentanol (0.5 ml, 4.6 mmole) dissolved in 5 ml toluene was reacted with 0.48 ml (4.6 mmole) $EtAlCl_2$ which was diluted with 5 ml toluene. The solution of $EtAlCl_2$ was cooled to approximately 78° C. and to this cooled solution pentanol solution was added dropwise. It was stirred at approximately 78° C. for 15 minutes and then warmed up to room temperature. Toluene was removed under vacuum.

Immobilization of Boron Trifluoride

In the reaction with $BF_3$, polyolefin containing hydroxy groups (150 mg) was reacted with a saturated solution of dichloromethane (15 ml) with boron trifluoride for 12 hours.

The excess boron trifluoride and dichloromethane was removed under vacuum. The most effective method involved a pretreatment of hydroxylated polyolefin (150 mg) with 0.1 ml (1 mmole) of n-BuLi (10M) in 7 ml of toluene for 1 hours. Polyolefin was filtered and washed with hexane to remove excess lithium compounds. The traces of solvent from polyolefin powder were removed by vacuum. To this polymer a saturated solution of dichloromethane with $BF_3$ was added. This mixture was stirred at room temperature for 3 hours. Dichloromethane and excess $BF_3$ were removed on vacuum line.

Synthesis of $C_5$-O-$BF_2$

Pentanol, 0.2 ml (1.84 mmole) was dissolved in 5 ml dichloromethane. To this solution, 20 ml of saturated solution of dichloromethane with $BF_3$ was added at room temperature. This mixture was stirred for 15 minutes. Dichloromethane and residual $BF_3$ was removed under vacuum.

Polymerization of Isobutylene

The polymerization was carried out in a high vacuum apparatus as shown in FIG. 7. The system consists of two 100 ml flasks (10 and 20) and one stopcock (30) was used to separate flasks. The other stopcock (40) was used to control the vacuum condition and nitrogen flow. In the dry box, the immobilized Lewis acid catalyst, such as 100 mg of catalyst (A), was charged to the flask A, the valve (40) was then closed. The whole apparatus was moved to a vacuum line and was pumped to high vacuum before closing the valve (40). Isobutylene (4 ml, 50 mmole) was condensed in the flask B and dissolved in about 20 ml hexane which was vacuum-distilled into the flask B. Isobutylene solution was warmed up to required temperature and transferred to the catalyst in flask A. After stirring the reaction mixture for required time, PIB solution was separated from immobilized catalyst by filtration in the dry box condition. PIB was obtained by evaporating the solvent under vacuum. The immobilized catalyst was then recharged to the flask A and the entire process was repeated.

EXAMPLE 54

Polymerization of Isobutylene by Polyolefin Immobilized Catalysts

The polymer immobilized catalyst was used as the Lewis acid catalyst (A) in the carbocationic polymerization of isobutylene as follows:

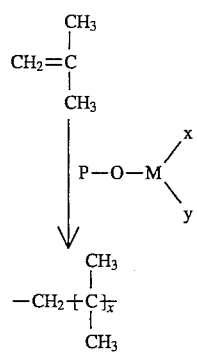

After the polymerization reaction, polymer solution (PIB) was filtered out and catalyst was reused in the subsequent polymerization reactions. In other words, the recovered catalyst was contacted with another isobutylene/hexane solution again, then following the same separation and recovery processes. The immobilized catalyst usually was recycled for a number of times without any significant reduction in its activity. Table 6 summarizes the results of PIB prepared by the fine powder form (particle size <1 mm) of catalyst (A), polypropylene bounded -$OAlCl_2$ catalyst.

TABLE 6

A Summary of PIB Prepared by PP—O—$AlCl_2$ (fine powder)

| Run # | Solvent | Temp. | Time (Min) | Mn | PDI | Yield % |
|---|---|---|---|---|---|---|
| 1 | hexane | RT | 90 | 1,050 | 2.0 | 100 |
| 2 | hexane | RT | 60 | 1,150 | 1.6 | 100 |
| 3 | hexane | RT | 20 | 1,150 | 1.8 | 100 |
| 4 | hexane | RT | 15 | 1,140 | 1.6 | 100 |
| 8 | hexane | RT | 15 | 1,180 | 1.5 | 100 |
| 10 | hexane | 0° C. | 15 | 4,540 | 2.57 | 100 |
| * | hexane | RT | 15 | 1,180 | 2.3 | 100 |
| * | hexane | 0° C. | 15 | 5,450 | 2.63 | 100 |

(* Control, pentanol based $C_5$—O—$AlCl_2$ catalyst)

The monomer to catalyst ratio was about 500. In most reaction cycles, the qualitative conversion from monomer to polymer was completed within 15 minutes. The same reactivity can be maintained in subsequent reaction cycles. This high catalyst reactivity is very unusual, especially in the heterogeneous reaction. The polymer-immobilize catalyst almost had the same activity as the corresponding small molecule, $C_5$-O-$AlCl_2$, which was used as the control experiment and was studied under the same reaction condition.

EXAMPLE 55

Table 7 shows another result of PIB prepared by catalyst (A) with the same overall catalyst concentration. However, catalyst (A) had particle size >5 mm, instead of the fine powder form. The experimental results of many consecutive reaction cycles are shown in Table 7.

TABLE 7

A Summary of PIB Prepared by PP—O—$AlCl_2$ (chunk)

| Run # | Solvent | Temp. | Time (Min) | Mn | PDI | Yield % |
|---|---|---|---|---|---|---|
| 1 | hexane | RT | 3 | 1,370 | 3.03 | 100 |
| 2 | hexane | RT | 2 | 1,660 | 2.59 | 100 |
| 3 | hexane | RT | 1 | 1,230 | 2.36 | 65 |
| 4 | hexane | RT | 3 | 1,110 | 2.56 | 100 |
| 8 | hexane | RT | 2 | 1,400 | 2.38 | 92 |
| 14 | hexane | RT | 3 | 1,320 | 2.57 | 100 |
| 15 | hexane | 0° C. | 5 | 5,450 | 2.63 | 76 |

In this case, the yield of PIB is very dependent on the reaction time. It required about three hours to complete the conversion. This slow carbocationic polymerization of isobutylene is believed to be due to the availability of catalyst. The big particles of PP-O-$AlCl_2$ are believed to greatly reduce the surface area of catalyst. The number of the active sites on the surface was very small. Despite the difference in the reaction rate upon the particle size, the catalyst can be recovered and reused in the subsequent reaction cycles. Elemental analysis and $^{27}Al$ NMR results show no significant change in the aluminum species after more than 10 reaction cycles.

EXAMPLE 56

In general, the use of the other immobilized catalysts, such as catalyst (B) and (C) as recited above, resulted in the same recycle and reuse of the catalysts as obtained in the isobutylene polymerization using catalyst (A). The same surface area-activity relationship was also observed. However, the resulting PIB structures, in terms of molecular weight, molecular weight distribution and unsaturation, were quite different. As shown in Examples 36–42, catalyst (B) resulted in higher molecular weight PIB than catalyst (A), and the molecular weight distribution of PIB was usually very broad, even bimodal. This phenomenon may be related to the multiple reactive species, -OAlEtCl and -O)$_2$AlEt, involved in the polymerization.

On the other hand, the catalyst (C), PB-O-BF$_2$, produced, using the same process as Examples 36–42, relatively low molecular weight PIB with quite narrow molecular weight distribution as shown in Table 8.

TABLE 8

A Summary of PIB Prepared by PB—O—BF$_3$ (powder)

| Run # | Solvent | Temp. | Time (Min) | Mn | PDI | Yield % |
|---|---|---|---|---|---|---|
| 1 | hexane | RT | 15 | 405 | 1.1 | 100 |
| 2 | hexane | RT | 15 | 450 | 1.2 | 100 |
| 3 | hexane | RT | 15 | 450 | 1.2 | 100 |
| 4 | hexane | RT | 15 | 420 | 1.4 | 100 |
| 5 | hexane | 0° C. | 15 | 580 | 1.2 | 100 |
| 8 | hexane | 0° C. | 15 | 640 | 1.5 | 100 |
| * | hexane | RT | 5 | 500 | 1.9 | 100 |
| * | hexane | 0° C. | 5 | 1080 | 2.0 | 100 |

(* Control, using pentanol based C$_5$—O—BF$_2$ soluble catalyst)

Molecular Structure of PIB

FIGS. 2 and 2A show the $^1$H NMR spectrum of PIB which was prepared by catalyst (A) (PP-O-AlCl$_2$) at room temperature. The overall spectrum is very similar to those of PIB prepared by soluble Al catalysts, such as AlCl$_3$, EtAlCl$_2$, Et$_2$AlCl, and the controlling C$_5$-O-AlCl$_2$ catalyst. Two major peaks are at 0.95 and 1.09 ppm, due to CH$_3$ and CH$_2$ protons in PIB polymer. There are some weak peaks located in the olefinic region, between 4.5 and 6.0 ppm.

The unsaturated double bond in polymer chain is the evidence of proton chain transfer reaction during the polymerization. In conjunction with the GPC molecular weight studies, the integrative intensity of olefinic region implies on average a double bond per polymer chain. In details, there are two quartets at 5.4 and 5.2 ppm and two singlets at 4.9 and 4.6 ppm. The singlets at 4.9 and 4.6 ppm are indicative of two types of nonequivalent vinylidene hydrogens, as recited in 25, which may be located at the end of polymer chain. The quartets at 5.4 and 5.2 ppm are the olefinic hydrogens coupled to methyl group, which are due to the internal double bonds, as recited in 26. The $^1$H NMR peak assignments are summarized in Table I above.

A significantly high amount of internal double bonds with various structures are present, which indicates carbocationic isomerization taking place by Lewis acid catalyst after the polymerization reaction.

Reactive PIB

A different $^1$H NMR spectra of PIB was observed by using immobilized catalyst C (PB-O-BF$_2$) at 25° and 0° C. As shown in FIGS. 3 and 3A, the chemical shifts in double bond region consist of two major singlets at 4.9 and 4.6 ppm, corresponding to terminal double bond, and two small peaks at 5.15 ppm, corresponding to internal double bond.

Comparing the integrated intensities between olefinic peaks, shown in FIG. 3A, the PIB prepared at 0° C. contains more than 85% of terminal double bonds. Theoretically, the maximum percentage of terminal double bonds in the final PIB cannot be more than 75%. It is reasonable to speculate that some effects from the substrate may play a role to control the termination reactions and to avoid any isomerization reactions. The control experiment, using C$_5$-O-BF$_2$ soluble catalyst under the same reaction condition, resulted in more than 30 mole % of internal double bonds.

Although this invention has been shown and described with respect to the detailed embodiments thereof, it will be understood by those skilled in the art that various changes in form and detail thereof may be made without departing from the spirit and scope of the claimed invention.

We claim:

1. A process for polymerizing cationically polymerizable monomer comprising contacting said monomer with a catalytically effective amount of an immobilized Lewis Acid catalyst in a manner and under conditions sufficient to polymerize said monomer, wherein said immobilized catalyst comprises polymer having at least one Lewis Acid immobilized within the structure therein, said polymer having monomer units represented by the structural formula:

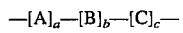

wherein a represents about 1 to about 99 mole % b represents about 0 to about 50 mole % c represents about 1 to about 99 mole % a+b+c is preferably about 100%;

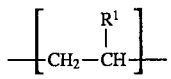

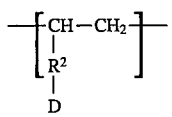

C is selected from the group consisting of:

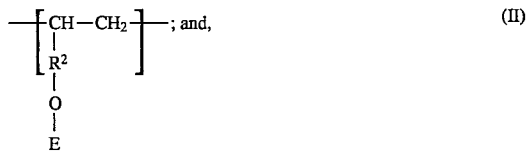

(III) combinations thereof, wherein

D is OH, halide, OR$^4$, NH$_2$, NHR$^3$, OM', or OM";

E is the residue of the reaction of at least one Lewis Acid with the D substituent of monomer unit B;

R$^1$ represents proton, C$_1$–C$_{24}$ alkyl group, or C$_3$–C$_{24}$ cycloalkyl;

R$^2$ represents C$_1$–C$_{24}$ alkylene group, C$_3$–C$_{24}$ cycloalkylene, C$_6$–C$_{18}$ arylene, or C$_7$–C$_{30}$ alkylarylene;

R$^3$ represents C$_1$–C$_{24}$ alkyl, C$_3$–C$_{24}$ cycloalkyl, C$_1$–C$_{24}$ aryl, or C$_7$–C$_{30}$ alkylaryl;

R$^4$ represents C$_1$–C$_{24}$ alkyl, C$_3$–C$_{24}$ cycloalkyl, C$_1$–C$_{24}$ aryl, or C$_7$–C$_{30}$ alkylaryl;

M' represents alkali metal;

M" represents alkaline-earth metal, wherein said immobilized catalyst is derived from a functionalized copolymer having a number average molecular weight of from 3,000 to 10,000,000 and having the structural formula

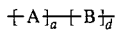

wherein A, B and a are defined above and d represents about 1 to about 99 mole %, and being equal to the sum of b+c.

2. The process of claim 1, wherein in said immobilized catalyst said monomer unit A is derived from propylene, 1-butene, ethylene and mixtures thereof.

3. The process of claim 2, wherein in said immobilized catalyst monomer unit A is derived from propylene.

4. The process of claim 2, wherein in said immobilized catalyst monomer unit A is derived from 1-butene.

5. The process of claim 1, wherein the cationically polymerizable monomer comprises at least one member selected from the group consisting of isobutene, 1-butene and 2-butene, styrenes, propylene, ethylene, dienes and combinations thereof.

6. The process of claim 1, wherein the cationically polymerizable monomer comprises isobutene.

7. The process of claim 1 wherein the cationically polymerizable monomer comprises at least one member selected from the group consisting of 1-butene and 2-butene.

8. The process of claim 1, wherein the polymer formed thereby comprises at least one member selected from the group consisting of poly(1-butene), poly-n-butene, poly(2-butene), polyethylene, polypropylene, polystyrene, polybutadiene and combinations thereof.

9. The process of claim 1, wherein polymerization is conducted in the presence of at least one Lewis Acid cocatalyst.

10. The process of claim 9 wherein polymerization is conducted by premixing cocatalyst with polymerizable monomer prior to entering a polymerization reactor.

11. The process of claim 9, wherein the cocatalyst is selected from the group consisting of HCl, HBr, and $H_2O$.

12. The process of claim 1 wherein polymerization is conducted in one or more reactors selected from the group consisting of a continuous reactor, a stirred tank reactor, a tubular reactor, a batch reactor, a semicontinuous reactor, and a fluidized bed reactor.

13. The process of claim 1 wherein polymerization is conducted in a fluidized bed reactor and the immobilized catalyst is fluidized.

14. The process of claim 1 wherein in said immobilized catalyst $R^2$ is $C_3$ to $C_{20}$ alkyl.

15. The process of claim 1 wherein in said immobilized catalyst, E is derived from Lewis Acid selected from the group consisting of boron halides, aluminum halides, alkyl aluminum halides, titanium halides, and combinations thereof.

16. The process of claim 1 wherein [C] is:

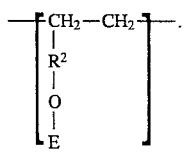

17. The process of claim 1 wherein at least one monomer stream is fed to a reactor containing said immobilized catalyst, said monomer stream containing at least one cationically polymerizable monomer, and wherein at least one discharge stream is removed from said reactor, the discharge stream containing polymer and unreacted monomer.

* * * * *